United States Patent
Stabrawa et al.

(10) Patent No.: US 10,114,763 B2
(45) Date of Patent: Oct. 30, 2018

(54) FORK-SAFE MEMORY ALLOCATION FROM MEMORY-MAPPED FILES WITH ANONYMOUS MEMORY BEHAVIOR

(71) Applicant: KOVE IP, LLC, Chicago, IL (US)

(72) Inventors: Timothy A. Stabrawa, Lombard, IL (US); Andrew S. Poling, Lombard, IL (US); Zachary A. Cornelius, Chicago, IL (US); Jesse I. Taylor, Glenside, PA (US); John Overton, Chicago, IL (US)

(73) Assignee: KOVE IP, LLC, Chicago, IL (US)

( * ) Notice: Subject to any disclaimer, the term of this patent is extended or adjusted under 35 U.S.C. 154(b) by 0 days.

(21) Appl. No.: 15/276,271

(22) Filed: Sep. 26, 2016

(65) Prior Publication Data

US 2017/0010978 A1    Jan. 12, 2017

Related U.S. Application Data

(63) Continuation-in-part of application No. 15/076,561, filed on Mar. 21, 2016.
(Continued)

(51) Int. Cl.
*G06F 12/10* (2016.01)
*G06F 3/06* (2006.01)
(Continued)

(52) U.S. Cl.
CPC .......... *G06F 12/1081* (2013.01); *G06F 3/065* (2013.01); *G06F 3/0605* (2013.01); *G06F 3/067* (2013.01); *G06F 3/0614* (2013.01); *G06F 3/0619* (2013.01); *G06F 3/0631* (2013.01); *G06F 3/0643* (2013.01); *G06F 3/0667* (2013.01); *G06F 3/0673* (2013.01);
(Continued)

(58) Field of Classification Search
CPC ........ G06F 12/10; G06F 12/08; G06F 3/0605; G06F 3/067; G06F 9/5016; G06F 3/0643; G06F 3/0667; G06F 3/0673; G06F 3/0614; G06F 2212/1001; G06F 2212/1048; G06F 2212/154; G06F 2212/1004; G06F 2212/657
USPC .......................................................... 711/203
See application file for complete search history.

(56) References Cited

U.S. PATENT DOCUMENTS 6,049,853 A     4/2000  Kingsbury et al.
8,095,770 B2 *  1/2012  Cameron .............. G06F 12/109
                                                711/202
(Continued)

FOREIGN PATENT DOCUMENTS

WO    WO 2008/132760 A2    11/2008

OTHER PUBLICATIONS

Chao Wang et al., "NVMalloc: Exposing an Aggregate SSD as a Memory Partition in Extreme-Scale Machines", dated 2012, pp. 957-968, *Parallel & Distributed Processing Symposium (IPDPS), 2012 IEEE 26th International,* Shanghai.
(Continued)

*Primary Examiner* — Jasmine Song
(74) *Attorney, Agent, or Firm* — Brinks Gilson & Lione

(57) ABSTRACT

Methods and systems are provided for fork-safe memory allocation from memory-mapped files. A child process may be provided a memory mapping at a same virtual address as a parent process, but the memory mapping may map the virtual address to a different location within a file than for the parent process.

20 Claims, 20 Drawing Sheets

Related U.S. Application Data

(60) Provisional application No. 62/139,310, filed on Mar. 27, 2015.

(51) Int. Cl.
*G06F 12/1081* (2016.01)
*G06F 12/14* (2006.01)
*G06F 12/08* (2016.01)
*G06F 9/50* (2006.01)

(52) U.S. Cl.
CPC ............ *G06F 9/5016* (2013.01); *G06F 12/08* (2013.01); *G06F 12/10* (2013.01); *G06F 12/1408* (2013.01); *G06F 2212/1004* (2013.01); *G06F 2212/1048* (2013.01); *G06F 2212/154* (2013.01); *G06F 2212/402* (2013.01); *G06F 2212/50* (2013.01); *G06F 2212/657* (2013.01)

(56) References Cited

U.S. PATENT DOCUMENTS

| | | | |
|---|---|---|---|
| 8,799,914 | B1 | 8/2014 | Metcalf |
| 2005/0204045 | A1 | 9/2005 | Belkin et al. |
| 2009/0113425 | A1 | 4/2009 | Ports et al. |
| 2010/0049775 | A1* | 2/2010 | Rajawat ............... G06F 9/5016 707/813 |
| 2013/0185720 | A1 | 7/2013 | Tuch et al. |
| 2015/0020071 | A1 | 1/2015 | Phelan et al. |
| 2015/0134930 | A1* | 5/2015 | Huang ............... G06F 12/1009 711/206 |

OTHER PUBLICATIONS

Iulian Moraru, "nvmalloc", dated Feb. 27, 2013, p. 1, GitHub, https://github.com/efficient/nvram/tree/master/nvmalloc.

"Hugetlbpage", dated Sep. 13, 2015, pp. 1-6, The Linux https://www.kernel.org/doc/Documentation/vm/hugetlbpage.txt.

Anonymous, "Remote direct memory access," dated Dec. 30, 2014, pp. 1-2, XP055288069, Retrieved from the Internet at URL: https://en.wikipedia.org/w/index.php?title=Remote_direct_memory_access&oldid=640243457.

Anonymous, "Copy-on-write," dated Nov. 26, 2014, pp. 1-3, XP055288087, Retrieved from the Internet at URL: https://en.wikipedia.org/w/index.php?title=Copy-on-write&oldid=635508783.

Extended European Search Report, dated Jul. 28, 2016, pp. 1-11, issued in European Patent Application No. 16162354.1, European Patent Office, Munich, Germany.

Non-Final Office Action, dated Jun. 12, 2017, pp. 1-14, issued in U.S. Appl. No. 15/076,561, U.S. Patent and Trademark Office, Alexandria, VA.

European Examination Report, dated Aug. 22, 2017, pp. 1-8, issued in European Patent Application No. 16 162 354.1, European Patent Office, Rijswijk, Netherlands.

Kevin Lim et al., "Disaggregated Memory for Expansion and Sharing in Blade Servers," International Symposium on Computer Architecture, dated Jun. 24, 2009, pp. 1-12, published by ACM, Austin, TX.

\* cited by examiner

FORK-SAFE MEMORY ALLOCATION FROM MEMORY-MAPPED FILES WITH ANONYMOUS MEMORY BEHAVIOR

CROSS-REFERENCE TO RELATED APPLICATIONS

This application is a continuation application of, and claims priority under 35 USC § 120 to non-provisional application Ser. No. 15/076,561, entitled "FORK-SAFE MEMORY ALLOCATION FROM MEMORY-MAPPED FILES WITH ANONYMOUS MEMORY BEHAVIOR", filed Mar. 21, 2016, the entire contents of which are incorporated by reference, which claims priority under 35 USC § 119(e) to, U.S. Provisional 62/139,310, "FORK-SAFE MEMORY ALLOCATION FROM MEMORY-MAPPED FILES WITH ANONYMOUS MEMORY BEHAVIOR" filed Mar. 27, 2015, the entire contents of which are incorporated by reference.

BACKGROUND

1. Technical Field

This application relates to memory and, in particular, to fork-safe memory.

2. Related Art

In many computing systems, memory is used to hold programs and data that are part of a working set of one or more tasks being performed by the system. The tasks may be performed in a process and/or a thread. The working set of the process and/or the thread may be a set of pages in a virtual address space of the process and/or the thread that are currently resident in the memory as opposed to the set of pages in the virtual address space that are swapped out of the memory. When used for this purpose, the memory is referred to as primary memory, or main memory. In other words, the primary memory may be memory in which the working sets of the processes executed by the system are stored. Primary memory is typically associated with a single computer system and is often physically located inside the computer system or directly attached to computer system's memory controller. In a non-uniform memory access (NUMA) architecture, the computer system may contain multiple CPU's, and each CPU may have some primary memory associated with it and/or directly attached to the CPU's memory controller. Primary memory is often arranged in pages, where a page is a unit of access or control supported by a memory controller. Primary memory is typically comprised of very fast media, such as random access memory (RAM).

Computing systems also typically have a form of secondary memory, which is used to hold programs and data that are not part of the working set of the tasks being performed by the system. The programs and data stored in secondary memory may be stored in a file system or be located in virtual memory pages that have been swapped out of primary memory by a virtual memory system. Virtual memory pages may be stored in a swap partition or in a swap file on a file system. Secondary memory may be associated with one or more computer systems and may be arranged in a variety of ways, such as physically located inside the computer system, directly attached to the CPU bus, attached to a peripheral bus, or connected to a peripheral via a cable or switched fabric. Secondary memory typically includes slower media (for example, flash memory or a spinning disk) than primary memory (for example, RAM).

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
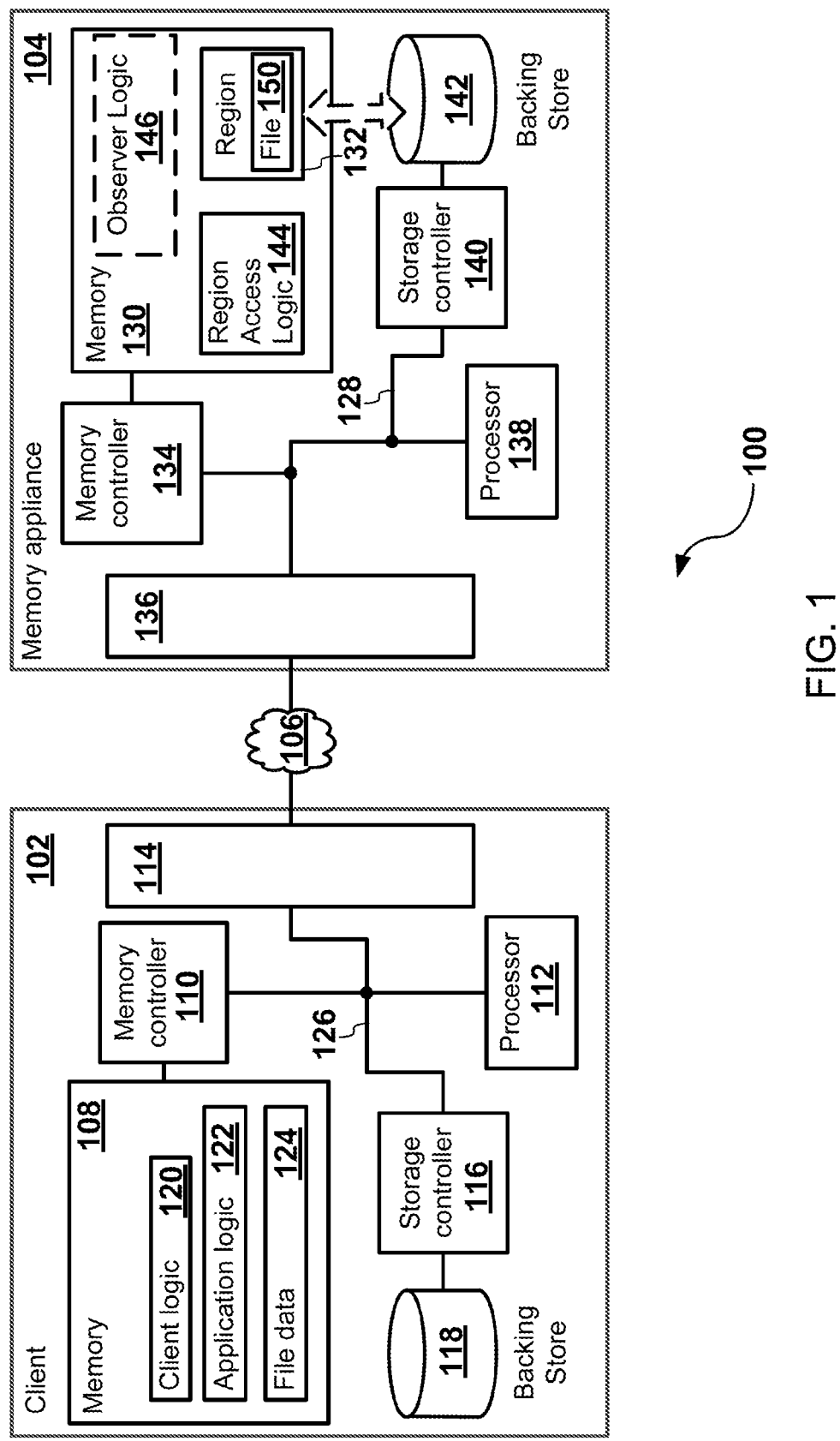
FIG. 1 illustrates a first example of a system to enable fork-safe memory allocation from memory-mapped files with anonymous memory behavior.

A memory appliance may be any computing device that includes memory that may be externally allocatable as primary memory. Henceforth, throughout this disclosure, unless specified otherwise, "memory" refers to primary memory. In one example, the memory appliance may include a communication interface, a memory, and a region access unit. The region access unit may receive, over a network via the communication interface, a request to allocate a portion of the memory for use as an external primary memory of a client on the network. The external primary memory of the client may be primary memory of the client that is external to the client. The region access unit of the memory appliance may allocate the portion of the memory for the client. The communication interface may provide the client access to the allocated portion of the memory. Examples of memory appliances are described in U.S. non-provisional patent application Ser. No. 14/530,908, filed Nov. 3, 2014, entitled "DYNAMICALLY PROVISIONABLE AND ALLOCATABLE EXTERNAL MEMORY," the entire contents of which is hereby incorporated by reference, and U.S. non-provisional patent application Ser. No. 14/554,655, filed Nov. 26, 2014, entitled "PROVISIONING OF EXTERNAL MEMORY", the entire contents of which is hereby incorporated by reference.

Methods and systems may be provided that provide fork-safe access to data on memory appliances or other devices accessed via memory-mapped I/O (Input/Output). Memory-mapped I/O is a mechanism in which communication with an I/O device is accomplished by accessing memory that is mapped to the I/O device. For example, memory and/or registers of the I/O device may be mapped to (or associated with) memory addresses accessible by a CPU (central processing unit) or other processor. The mapped memory addresses may be referred to as virtual memory addresses. When any virtual memory address is accessed by the CPU, the virtual memory address may reference a portion of physical RAM in primary memory and/or memory of the I/O device. Thus, instructions executed by the CPU that access the virtual memory address may also access the I/O device.

The memory-mapped I/O may involve a memory-mapped file. The memory-mapped file may be a segment of virtual memory which has been assigned to a portion of a file or a pseudo file. Accordingly, the memory-mapped file may be accessed via memory-mapped I/O.

By way of an example, a system may provide one or more pseudo files in a filesystem; a user and/or a process may open the one or more of the pseudo files; and memory map (mmap) operations may be performed on the one or more pseudo files. A pseudo file may be a logical entity accessible through a file interface, where the pseudo file may be accessed or otherwise used like a file through the file interface, but the pseudo file may not actually be a file stored in a traditional file system. For example, reads and writes to the pseudo file may be translated into reads and writes to one or more of the memory appliances instead of accessing data in the traditional file system. In addition to accessing the pseudo file directly through the file interface, the pseudo file may be accessed through a memory operation on a virtual memory address mapped to the pseudo file. Alternatively or in addition to the pseudo file, the memory map operations may be performed on any other type of file, such as a file in a traditional filesystem, a block device file, etc. Other examples of a file are listed elsewhere in this document.

The capability to memory map the file may be provided by an operating system. A memory allocation wrapper around this memory map capability may be provided through which a user and/or a process may allocate memory from the memory appliance to use as its application memory. The memory allocation wrapper or interface may be used without re-compiling the application, such as if the memory allocation wrapper and/or related logic is configured to override and/or take the place of interfaces and/or programmatic procedures that would otherwise be provided by another logic, such as the operating system or a system library.

In order to implement a complete memory allocation solution using memory-mapped files, the system may address inherent differences in how memory-mapped files are treated versus anonymous memory. Anonymous memory is memory usually obtained from the operating system by memory allocation interfaces, such as malloc( ) mmap( ) brk( ) and/or sbrk( ) in C programs. Specifically, when a process forks using anonymous memory, the child process effectively obtains a copy of the parent process's anonymous memory at the time of the fork (most modern operating systems achieve this via copy-on-write semantics). The copying of anonymous memory means that changes to the anonymous memory in either the child process or the parent process after the fork do not appear in the other respective process's view of the memory. A process may fork for different reasons. In one example, a process may fork in order to achieve greater parallelization in doing some computation. In another example, a process may fork in order to start processes that do different parts of a larger task. In another example, a process may fork in order to start other processes requested by a user (such as a login shell forking, and then executing a program typed by the user into the shell's command prompt). Without the ability to support proper forking semantics, a memory allocation solution using memory-mapped files may be severely limited.

In contrast to anonymous memory, memory-mapped file mappings are typically shared between the parent and child, such that changes to the mapped memory in either the child process or parent process after the fork appear in the other respective process's view of the memory. The memory-mapped file mappings are shared if the memory-mapped file is opened in a shared mode. If, instead, the memory-mapped file is opened in a private mode, any changes to the mapped memory are stored in anonymous memory and are never written back to the backing store.

Anonymous memory may cache data in an implementation of a memory-mapped file backed by a file opened in private mode. Alternatively, anonymous memory may store data that is completely unrelated to a memory-mapped file. In either case, the anonymous memory may be backed by one or more swap files and/or swap devices instead of, or in addition to, a file that backs a memory-mapped file.

The methods and systems described herein may address the problem of how to achieve a forking behavior similar to anonymous memory when using memory-mapped files. One technical advantage of such systems and methods may be that an application that forks processes may use external memory via a memory allocation interface without changing the application's source code or re-compiling the application. The term "process" as used herein refers to a process and/or a thread.

Another technical advantage may be that such systems and methods may interface with standard and/or pre-existing interfaces of an operating system or a kernel without having to modify or patch the operating system or the kernel.

Yet another technical advantage may be that applications may scale to arbitrarily large working sets while maintaining anonymous memory-like access times to the data in their allocated memory buffers. The actual memory used to hold the allocated memory buffers may be near to and/or far from the computer(s) executing the applications and/or may use memory appliances of varying performance, as indicated by an administrative policy. Use of an administrative policy to allocate external memory is described in U.S. non-provisional patent application Ser. No. 14/530,908, filed Nov. 3, 2014, entitled "DYNAMICALLY PROVISIONABLE AND ALLOCATABLE EXTERNAL MEMORY," and U.S. non-provisional patent application Ser. No. 14/554,655, filed Nov. 26, 2014, entitled "PROVISIONING OF EXTERNAL MEMORY."

Another advantage may be an ability to manage levels of service by using multiple files with different backing stores. For example, a service level may be performance and different backing stores may have varying performance characteristics. Alternatively or in addition, the service level may be security and/or isolation, and different files may be used for different users. Alternatively or in addition, the service level may be ownership and/or authorization.

In some examples, encryption and/or decryption may be performed by a client at the time of a write to and/or a read from a backing store. An advantage of performing encryption and/or decryption at the time of writeback and/or read from backing store may be, for example, that the cost of encryption and/or decryption is spread amongst clients instead of being a burden upon memory appliances.

FIG. 1 illustrates a first example of a system 100 to enable fork-safe memory allocation from memory-mapped files with anonymous memory behavior. The system 100 may include a client 102, a memory appliance 104, and one or more interconnects 106. The system 100 may include additional, fewer, or different elements. For example, the system 100 may include multiple clients and/or multiple memory appliances. In another example, the system 100 may include just the client 102 or just the memory appliance 104.

The memory appliance 104 and/or its components may be the memory appliance and/or corresponding components described in U.S. non-provisional patent application Ser. No. 14/530,908, filed Nov. 3, 2014, entitled "DYNAMICALLY PROVISIONABLE AND ALLOCATABLE EXTERNAL MEMORY," or the memory appliance and/or corresponding components described in U.S. non-provisional patent application Ser. No. 14/554,655, filed Nov. 26, 2014, entitled "PROVISIONING OF EXTERNAL MEMORY."

The client 102 may include a memory 108, a memory controller 110, a processor 112, and a communication interface 114. The client 102 may include additional, fewer, or different components. For example, the client 102 may include a storage controller 116, a backing store 118, multiple storage controllers, multiple backing stores, multiple memories, multiple memory controllers, multiple processors, or any combination thereof.

The memory appliance 104 may include memory 130 that may be externally allocatable as primary memory to the client 102. The client 102 may be a machine or a device that requests this external memory. The client 102 may contain local memory, such as the memory 108 illustrated in FIG. 1, which operates as primary memory of the client 102. However, an external memory allocation may be requested by the client 102 to scale the capacity of the primary memory available locally to the client 102. Alternatively, or in addition, the client 102 may operate the locally available primary memory, such as the memory 108 in FIG. 1, as a cache memory when accessing the externally allocated memory from the memory appliance 104. For example, the cache memory may be used by the client 102 to reduce average time to access data from the externally allocated memory in the memory appliance 104. The locally available primary memory of the client 102 may be faster than the externally allocated memory and may be used to store copies of data from frequently used memory locations of the externally allocated memory. For example, the client 102 may read data from or write data to a location in the externally allocated memory. The client 102 may first check whether a copy of the data is in the cache memory, such as the locally available memory. If so, the client 102 may read the data from or write the data to the cache memory, which may be faster than reading from or writing to the externally allocated memory.

The memory appliance 104 and the client 102 may communicate with each other over the one or more interconnects 106. The communication may be unidirectional or bi-directional. The one or more interconnects 106 may electrically couple the memory appliance 104 and the client 102. Each interconnect 106 may include a physical component that transports signals between two or more devices. For example, each interconnect 106 may be a cable, a wire, a parallel bus, a serial bus, a network, a switched fabric, a wireless link, a point to point network, or any combination of components that transport signals between devices. Alternatively or in addition, the memory appliance 104 and the client 102 may communicate over a communication network, such as a switched fabric, a Storage Area Network (SAN), an InfiniBand network, a Local Area Network (LAN), a Wireless Local Area Network (WLAN), a Personal Area Network (PAN), a Wide Area Network (WAN), a circuit switched network, a packet switched network, a telecommunication network or any other now known or later developed communication network. The communication network, or simply "network", may enable a device to communicate with components of other external devices, unlike buses that only enable communication with components within and/or plugged into the device itself. Thus, a request for primary memory made by an application executing on the client 102 may be sent over the interconnect 106, such as the network. The request may be sent to one or more devices external to the client 102, such as the memory appliance 104. In response to the request, the application that made the request may be allocated memory from memories of one or more memory appliances that are external to the client 102.

An external memory allocation may reference one or more regions 132 in the memory 130 of the memory appliance 104. The client 102 may allocate and/or manipulate external memory allocations and/or the regions 132 using allocation logic requests.

Multiple memory appliances may be "pooled" to create a dynamically allocatable, or allocable, external memory pool (not shown). For example, new memory appliances may be discovered, or as they become available, memory of, or within, the new memory appliances may be made part of the memory pool. The memory pool may be a logical construct. The memory appliances involved in the memory pool may or may not know about each other. As additional memory appliances are discovered, the memory of the memory appliances may be added to the memory pool, in other words, the portions of the memory of the memory appliances is made available for use by the requesting client. The client 102 may be able to request dynamically allocatable external memory from the memory pool which may be available for use, even though the external memory exists on other machines, unknown to the client 102. The client 102 requesting memory, at time of requesting the memory, may be unaware of the size of the memory pool or other characteristics related to configuration of the memory pool. The memory pool may increase or decrease at any time without a service interruption of any type to the memory consumers, such as the clients requesting memory.

The external memory allocations may span multiple memory appliances. Thus, the external memory system makes available memory capacity, larger than what may be possible to fit into the requesting client, a single memory appliance, or a single server. The memory capacity made available may be effectively unlimited because any number of memory appliances may be part of the memory pool. The memory pool may be expanded based on various conditions being met. For example, the maximally price-performant memory available may be selected to grow the memory pool in a maximally cost-efficient manner. Alternatively, or in addition, memory appliances may be added at any moment to extend the capacity and performance of the aggregate pool, irrespective of characteristics of the memory appliances. In contrast, the individual client 102, such as a server computer, may be limited in physical and local memory capacity, and moreover, in order to achieve the largest memory capacity, expensive memory may have to be used or installed in the individual client 102 absent dynamically allocatable external memory.

Instead, with dynamically allocatable external memory, such as the memory pool, less expensive servers with less memory capacity may be purchased than may otherwise be required without dynamically allocatable external memory. One may instead buy smaller, more energy-efficient and cost-effective servers and extend their memory capacity, on demand, by using dynamically allocatable external memory.

In one example, the client 102 may be server cluster. By using external memory allocation and provisioning, the server cluster need not require all of the servers to have sufficient pre-existing local memory in order to process all anticipated loads. A typical approach to have each individual server to have full capacity memory leads to over-purchasing memory for all servers in order to satisfy exceptional cases needed by some servers, some of the time. Instead, with external memory, the server cluster may provision portions of external memory where and when needed, thereby saving money, space, and energy, by providing on-demand memory to any capacity. The server cluster may even support memory capacities impossible to physically fit into a single machine.

In another example, external memory may be dynamically allocated according to performance ratings of the external memory. For example, higher-performance external memory may be provisioned for some purposes, and/or lower-performance, but larger capacity and/or lower cost, external memory for other purposes.

The memory pool may provide dynamic memory allocation so that the client 102 may request to receive external memory, and when the external memory is no longer needed, the client 102 may release the external memory back to the memory pool. The dynamic memory allocation may enable the client 102 to allocate a provisioned amount of external memory for various purposes on the client 102 at various times, on-the-fly, according to client-logic needs rather than based on an installation policy, or local, internal memory of a particular server.

The client 102 may access the dynamically allocatable external memory through a variety of methods. The different methods to access the external memory may vary the lowest level addressing used to address the external memory. The client 102 may be provided with different interfaces for each respective access method. For example, a memory-mapped file, a physical mapping, a programmatic API, or any other application-specific interface, may be provided to access the external memory. The multiple access methods may be employed at the same time, and even against the same external memory allocation.

The memory 108 of the client 102 may include a client logic 120. The memory 108 of the client may include additional, fewer, or different components. For example, the memory 108 of the client 102 may include an application logic 122, and/or file data 124. The processor 112 may execute computer executable instructions that are included in the client logic 120 and/or the application logic 122. The components of the client 102 may be in communication with each other over an interconnect 126, similar to, or the same as, an interconnect 128 in the memory appliance 104 or over any other type of interconnect.

The application logic 122 may include a user application, an operating system, a kernel, a device driver, a device firmware, a virtual machine, a hypervisor, a container, a jail, a zone, a cloud computing interface, a circuit, a logical operating system partition, or any other logic that uses the services provided by the client logic 120. A container, a jail, and a zone are technologies that provide userspace isolation or compartmentalization. Any process in the container, the jail, or the zone may communicate only with processes that are in the same container, the same jail, or the same zone.

The file data 124 may include one or more portions of the contents of a file 150. The file 150 may be, for example, a pseudo file for accessing external memory, such as the memory 130 on the memory appliance 104. In other examples, the file 150 may be any other type of file. Accordingly, the file data 124 may include at least a subset of a memory-mapped file in the memory 108 of the client 102. The one or more portions of the file 150 may be uniform in size. For example, the one or more portions may each be the size of a memory page. The file data 124 may include cached pages that have been read via the memory-mapped interface and/or that have been written to, but that may not yet have been written back to the file. In at least one example implementation, the file data 124 may be included in a page cache, a buffer cache, and/or any other type of cache. The file 150 may be included in the memory 130 of the memory appliance 104. For example, the file 150 may be included in the region 132. Alternatively or in addition, the file may be the region 132.

The application logic 122, the memory controller 110, the processor 112, the one or more communication interfaces 114, the one or more interconnects 126, the storage controller 116, and/or the backing store 118 may be the same or similar to the correspondingly-named components in the client described in U.S. non-provisional patent application Ser. No. 14/530,908, filed Nov. 3, 2014, entitled "DYNAMICALLY PROVISIONABLE AND ALLOCATABLE EXTERNAL MEMORY," or the correspondingly-named components described in U.S. non-provisional patent application Ser. No. 14/554,655, filed Nov. 26, 2014, entitled "PROVISIONING OF EXTERNAL MEMORY."

By way of example, the system 100 may store data of one or more memory regions in one or more memory appliances. The memory appliance 104 may be a server, a device, an embedded system, a circuit, a chipset, an integrated circuit, a field programmable gate array (FPGA), an application-specific integrated circuit, a virtual machine, an operating system, a kernel, a device driver, a device firmware, a hypervisor service, a cloud computing interface, and/or any other hardware, software, and/or firmware entity. The memory appliance 104 may include the memory 130, a memory controller 134, a communication interface 136, a processor 138, a storage controller 140, and a backing store 142. In other examples, the memory appliance 104 may include additional, fewer, or different elements. For example, the memory appliance 104 may not include the storage controller 140 and the backing store 142. The memory 130 may further include a region access logic 144, the regions 132, region metadata (not shown), and an observer logic 146. The observer logic 146 may not be present in some examples. The region access logic 144 and/or the observer logic 146 may be referred to as a region access unit and/or a observer unit, respectively. The memory appliance 104 may include additional, fewer, or different elements. For example, the memory appliance 104 may include multiple backing stores, multiple storage controllers, multiple memories, multiple memory controllers, multiple processors, or any combination thereof. The memory appliance 104 may store data received over the one or more interconnects 106.

The region access logic 144 in the memory appliance 104 may register the regions 132 or portions of the regions 132 with one or more communication interfaces. Alternatively, or in addition, the region access logic 144 may provide and/or control access to the region by one or more clients. The communication interface 114 in the client 102 may provide client-side memory access to the memory 130 of the memory appliance 104, to the regions 132, and/or to portions of the regions 132 in the memory appliance 104. The one or more interconnects 106 or networks may transport data between the communication interface 114 of the client 102 and the communication interface 136 of the memory appliance 104. For example, the communication interfaces 114 and 136 may be network interface controllers or host controller adaptors.

A client-side memory access may bypass the processor 112, such as a CPU (Central Processing Unit), at the client 102 and/or may otherwise facilitate the client accessing the memory 130 on the memory appliance 104 without waiting for an action by the processor 112 or 138 included in the client 102, in the memory appliance 104, or both. For example, the client-side memory access may be based on the Remote Direct Memory Access (RDMA) protocol. The RDMA protocol may be carried over an InfiniBand interconnect, an iWARP interconnect, an RDMA over Converged Ethernet (RoCE) interconnect, and/or any other interconnect and/or combination of interconnects known now or later discovered. Alternatively, or in addition, the client-side memory access may be based on any other protocol and/or interconnect that may be used for accessing memory. A protocol that may be used for accessing memory may be a CPU protocol/interconnect, such as HyperTransport and/or Quick Path Interconnect (QPI). Alternatively, or in addition, a protocol that may be used for accessing memory may be a peripheral protocol/interconnect, such as Peripheral Component Interconnect (PCI), PCI Express, PCI-X, ISA, and/or any other protocol/interconnect used to interface with peripherals and/or access memory. The communication interfaces 114 and 136 may provide reliable delivery of messages and/or reliable execution of memory access operations, such as any memory access operation carried out when performing the client-side memory access. Alternatively, or in addition, delivery of messages and/or execution of memory access operations may be unreliable, such as when data is transported between the communication interfaces using the User Datagram Protocol (UDP). The client 102 may read, write, and/or perform other operations on the memory 130, to the regions 132 within the memory 130, and/or to portions of the regions 132 using client-side memory access. In providing client-side memory access, the client 102 may transmit requests to perform memory access operations to the memory appliance 104. In response, the memory appliance 104 may perform the memory access operations. Similar to the storage device of U.S. patent application Ser. No. 13/036,544, filed Feb. 28, 2011, entitled "High performance data storage using observable client-side memory access" by Stabrawa, et al., which published as US Patent Application Publication US2012/0221803 A1, and which is hereby incorporated by reference, the memory appliance 104 may observe or otherwise identify the memory access operations. In response to identifying the memory access operations, the memory appliance 104 may, for example, copy the data of the region 132 to one or more backing stores independently of performing the memory access operations on the memory. A backing store, such as the backing store 142 illustrated in FIG. 1, may include one or more persistent non-volatile storage media, such as flash memory, phase change memory, memristors, EEPROM, magnetic disk, tape, or some other media. The memory 130 and/or the backing store 142 (if included) may be subdivided into regions.

The memory 108 and/or 130 may be any memory or combination of memories, such as a solid state memory, a random access memory (RAM), a dynamic random access memory (DRAM), a static random access memory (SRAM), a flash memory, a read-only memory (ROM), an electrically erasable programmable read-only memory (EEPROM), a flash memory, a phase change memory, a memristor memory, any type of memory configured in an address space addressable by the processor, or any combination thereof. The memory 108 and/or 130 may be volatile or non-volatile, or a combination of both.

The memory 108 and/or 130 may be a solid state memory. Solid state memory may include a device, or a combination of devices, that stores data, is constructed primarily from electrical conductors, semiconductors and insulators, and is considered not to have any moving mechanical parts. Solid state memory may be byte-addressable, word-addressable or block-addressable. For example, most dynamic RAM and some flash RAM may be byte-addressable or word-addressable. Flash RAM and other persistent types of RAM may be block-addressable. Solid state memory may be designed to connect to a memory controller, such as the memory controller 134 in the memory appliance 104, via an interconnect bus, such as the interconnect 128 in the memory appliance 104.

Solid state memory may include random access memory that permits stored data to be read and/or written in any order (for example, at random). The term "random" refers to the fact that any piece of data may be returned and/or written within a constant time period, regardless of the physical location of the data and regardless of whether the data is related to a previously read or written piece of data. In contrast, storage devices such as magnetic or optical discs rely on the physical movement of the recording medium or a read/write head so that retrieval time varies based on the physical location of the next item read and write time varies based on the physical location of the next item written. Examples of solid state memory include, but are not limited to: DRAM, SRAM, NAND flash RAM, NOR flash RAM, phase change memory (PRAM), EEPROM, FeRAM, MRAM, CBRAM, PRAM, SONOS, RRAM, Racetrack memory, NRAM, Millipede, T-RAM, Z-Ram, and TTRAM.

In contrast to solid state memory, solid state storage devices are systems or devices that package solid state memory with a specialized storage controller through which the packaged solid state memory may be accessed using a hardware interconnect that conforms to a standardized storage hardware interface. For example, solid state storage devices include, but are not limited to: flash memory drives that include Serial Advanced Technology Attachment (SATA) or Small Computer System Interface (SCSI) interfaces, Flash or DRAM drives that include SCSI over Fibre Channel interfaces, DRAM drives that include SATA or SCSI interfaces, and USB (universal serial bus) flash drives with USB interfaces.

In an example, each portion of the memory 130 that includes a corresponding one of the region access logic 144 and the region 132 may be of a different type than other portions of the memory 130. For example, the memory 130 may include a ROM and a solid state memory, where the ROM includes the region access logic 144, and the solid state memory includes the region 132. The memory 130 may be controlled by the memory controller 134. The 130 memory may include more, fewer, or different components. For example, the memory 130 may include the observer logic 146.

The processor 112 and/or 138 may be a general processor, a central processing unit (CPU), a server, a microcontroller, an application specific integrated circuit (ASIC), a digital signal processor, a field programmable gate array (FPGA), a digital circuit, an analog circuit, or any combination thereof. The processor 112 and/or 138 may include one or more devices operable to execute computer executable instructions or computer code embodied in the memory 108 and/or 130 or in other memory to perform features of the system 100. For example, the processor 112 of the client 102 may execute computer executable instructions that are included in the client logic 120 and/or the application logic 122.

The processor 112, the memory controller 110, and the one or more communication interfaces 114 of the client 102 may each be in communication with each other. Each one of the processor 112, the memory controller 110, and the one or more communication interfaces 114 may also be in communication with additional components, such as the storage controller 116, and the backing store 118. The communication between the components of the client 102 may be over the interconnect 126, which may be a bus, a point-to-point connection, a switched fabric, a network, any other type of interconnect, or any combination of interconnects. The communication may use any type of topology, including but not limited to a star, a mesh, a hypercube, a ring, a torus, or any other type of topology known now or later discovered. Alternatively or in addition, any of the processor 112, the memory 108, the memory controller 110, and/or the communication interface 114 may be logically or physically combined with each other or with other components, such as with the storage controller 116, and/or the backing store 118. The relationship between the processor 138, the memory controller 134, and the communication interface 136 of the memory appliance 104 may be the same or similar as the processor 112, the memory controller 110, and the one or more communication interfaces 114 of the client 102. In examples where the processor 112 or 138, such as a CPU, is logically and/or physically combined with other components, such as the communication interface 114 or 136, the client-side memory access may be said to bypass the processor 112 or 138 and/or be independent of the processor 112 or 138 if the data transfer for the client-side memory access is controlled by and/or performed by the communication interface 114 or 136 and/or any other component other than the processor 112 or 138. For example, the communication interface 114 or 136 and/or a direct memory access (DMA) controller may transfer the data independently of the processor 112 or 138 even if the communication interface 114 or 136 and/or DMA controller is included in an integrated chip that also includes the processor 112 or 138. Although the processor 112 or 138 may initiate a memory access operation, such as a read or a write to an address in the address space of the processor 112 or 138, for the client-side memory access, if the communication interface 114 or 136 and/or the DMA controller executes the memory access operation, then the memory access operation is said to be performed independently of the processor 112 or 138.

The memory controller 110 or 134 may include a hardware component that translates memory addresses specified by the processor 112 or 138 into the appropriate signaling to access corresponding locations in the memory 108 or 130. The processor 112 or 138 may specify the address on the interconnect 126 or 128. The processor 112 or 138, the interconnect 126 or 128, and the memory 108 or 130 may be directly or indirectly coupled to a common circuit board, such as a motherboard. In one example, the interconnect 126 or 128 may include an address bus that is used to specify a physical address, where the address bus includes a series of lines connecting two or more components. The memory controller 110 or 134 may, for example, also perform background processing tasks, such as periodically refreshing the contents of the memory. In one example implementation, the memory controller 110 or 134 may be included in the processor 112 or 138.

The one or more communication interfaces 114 or 136 may include any one or more physical interconnects used for data transfer. In particular, the one or more communication interfaces may facilitate communication between the client 102 and the memory appliance 104 and/or any other device. The one or more communication interfaces 114 or 136 may communicate via the one or more interconnects 106. The one or more communication interfaces 114 or 136 may include a hardware component. In addition, the one or more communication interfaces 114 or 136 may include a software component. Examples of the communication interface 114 or 136 include a Direct Memory Access (DMA) controller, an RDMA controller, a Network Interface Controller (NIC), an Ethernet controller, a Fibre Channel interface, an InfiniBand interface, a SATA interface, a SCSI interface, a USB interface, an Ethernet interface, or any other physical communication interface. The one or more communication interfaces 114 or 136 may facilitate client-side memory access, as described throughout this disclosure.

The region 132 may be a configured area of the memory 130 that is accessible via a memory access protocol and/or a storage protocol. Storage protocols and memory access protocols are described below. The region 132 may be a logical region which maps a sequence of data blocks to corresponding memory locations in the memory 130. Therefore, in addition to the data blocks themselves, the region 132 may include region information, such as a mapping of data blocks to memory locations or any other information about the data blocks. The data blocks of the region 132, which may be configured by the region access logic 144, may all be stored in the memory 130.

The storage controller 116 or 140 of the client 102 or the memory appliance 104 may include a component that facilitates storage operations to be performed on the backing store 118 or 142. A storage operation may include reading from or writing to locations within the backing store. The storage controller 116 or 140 may include a hardware component. Alternatively or in addition, the storage controller may include a software component.

The backing store 118 or 142 may include an area of storage comprising one or more persistent media, including but not limited to flash memory, phase change memory, Memristors, EEPROM, magnetic disk, tape, or other media. The media in the backing store may potentially be slower than the memory on which the region is stored.

The storage controller 116 and/or the backing store 118 of the client 102 may be internal to the client 102, a physically discrete component external to the client 102 and coupled to the backing store 118, included in the client 102 or in a device different from the client 102. Alternatively, or in addition, a region included in the memory appliance 104 may be used as the backing store 118 for the client 102.

The memory access protocol may be any communication protocol used to transfer data between a memory in a first device, such as the memory 108 in the client 102, and a memory in a second device, such as the memory 130 in the memory appliance 104, where the data is transferred independently of CPU's in the first and second devices, such as the processor 112 in the client 102 and the processor 138 in the memory appliance 104. Therefore, in examples where the first device includes an operating system, the data may be transferred from the memory of the first device to the memory of the second device without involvement of the operating system. Although instructions executed by the CPU may direct a hardware data controller to transfer the data from the memory of the first device to the memory of the second device, the actual transfer of the data between the memories may be completed without involvement of the CPU and, if the first device includes an operating system, without involvement of the operating system. The memory access protocol may describe, for example, a format of the request for the memory access operation to be performed on the memory in the second device or system.

The memory access protocol may be implemented, for example, using one or more hardware controllers, such as the communication interface 114 in the client 102 and the communication interface 114 in the memory appliance 104. The memory access protocol and electrical characteristics of the hardware controller may be part of a common standard. Accordingly, the memory access protocol and electrical characteristics of the communication interfaces 114 and 136 may be part of one standard. In one example, the access protocol may be the RDMA protocol implemented in the communication interfaces 114 and 136, where the memory access protocol and the communication interfaces 114 and 136 conform to an InfiniBand standard. In a second example, the memory access protocol may be Internet Wide Area RDMA Protocol (iWARP), where iWARP is implemented in the communication interfaces 114 and 136, and where the communication interfaces 114 and 136 conform to an iWARP standard. The iWARP standard, which is an Internet Engineering Task Force (IETF) protocol, is RDMA over TCP (Transport Control Protocol). In a third example, the memory access protocol may be RDMA over Converged Ethernet (RoCE), where RoCE is implemented in the communication interfaces 114 and 136, and where the communication interfaces 114 and 136 conform to RoCE and Ethernet standards. In a third example, the memory access protocol may be a PCI bus-mastering protocol implemented in the communication interfaces 114 and 136, where the communication interfaces 114 and 136 conform to a PCI standard. The memory access protocol, such as RDMA, may be layered directly over a transport protocol, such as TCP.

A storage protocol may be any communications protocol used to transfer data between a block storage device or system, such as the memory appliance 104, and a device or system, such as the client 102, which stores data in, and/or retrieves data from, the block storage device or system. A storage protocol may be implemented, for example, using one or more software and/or hardware storage controllers, such as the storage controller 116 and/or the 140. The storage protocol and electrical characteristics of the hardware storage controller may be part of a common standard. In one example, the storage protocol may be the universal serial bus mass storage device class (USB MSC or UMS), which is a set of computing communications protocols defined by the USB Implementers Forum that runs on a hardware bus, such as the interconnect, that conforms to the USB standard. In a second example, the storage protocol may be the SCSI command protocol. In a third example, the storage protocol may be the SATA protocol. Additional examples of the storage protocol include Serial Attached SCSI (SAS) and Internet Small Computer System Interface (iSCSI). Alternatively or in addition, the region access logic may provide block-level access using any storage protocol that transfers data with a data transfer protocol, such as SCSI over Fibre Channel, SCSI RDMA Protocol (SRP) over Remote Direct Memory Access (RDMA), iSCSI over TCP/IP, or any other combination of storage protocol and data transfer protocol known now or discovered in the future.

Accessing the region 132 of the memory appliance 104 using the storage protocol may be slower than accessing the region 132 using the memory access protocol. In contrast to the memory access protocol, the processor 112 of the client 102 may interact with the storage controller 140 during the transfer of data to the block storage device or system, where the storage controller implements the storage protocol. Therefore, the storage protocol is different from the memory access protocol.

Figure 2:
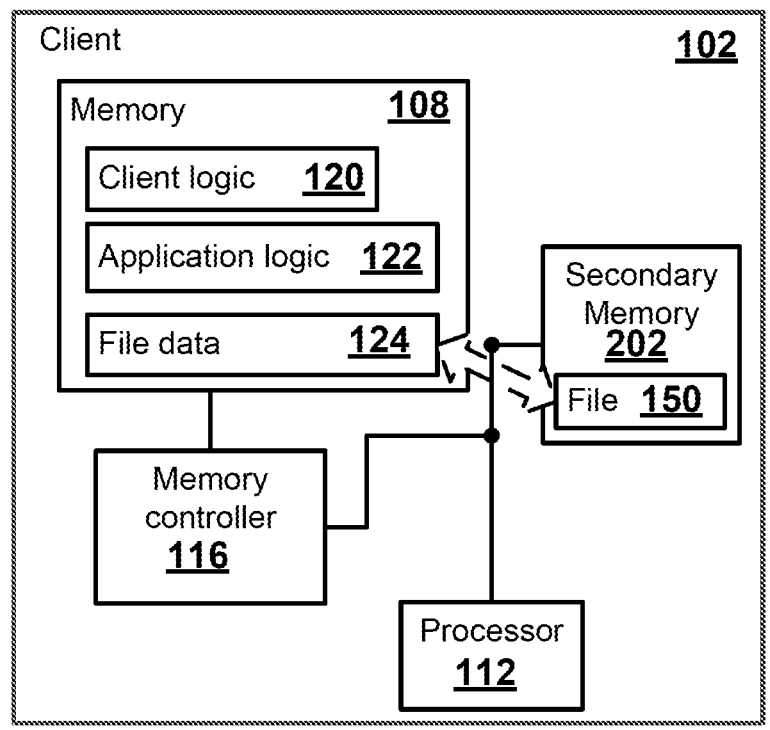
FIG. 2 illustrates a second example of a system to enable fork-safe memory allocation from memory-mapped files with anonymous memory behavior.

FIG. 2 illustrates a second example of the system 100 to enable fork-safe memory allocation from memory-mapped files with anonymous memory behavior. The system 100 illustrated in FIG. 2 may not use or have anything to do with allocatable external memory. The system 100 may include the client 102, where the file 150 is included in a secondary memory 202 included in the client 102. The system 100 may include additional, fewer, or different elements than illustrated.

The secondary memory 202 may be the secondary memory described in U.S. non-provisional patent application Ser. No. 14/530,908, filed Nov. 3, 2014, entitled "DYNAMICALLY PROVISIONABLE AND ALLOCATABLE EXTERNAL MEMORY," or the secondary memory described in U.S. non-provisional patent application Ser. No. 14/554,655, filed Nov. 26, 2014, entitled "PROVISIONING OF EXTERNAL MEMORY." Alternatively or in addition, the secondary memory 202 may be the backing store 118 and/or the storage controller 116. Alternatively or in addition, the secondary memory 202 may include any one or more data storage media, such as DRAM, flash memory, solid-state disks, PCIe-attached storage, etc. The file 150 may be included in the secondary memory 202. Alternatively or in addition, the file 150 may be the secondary memory 202.

Figure 3:
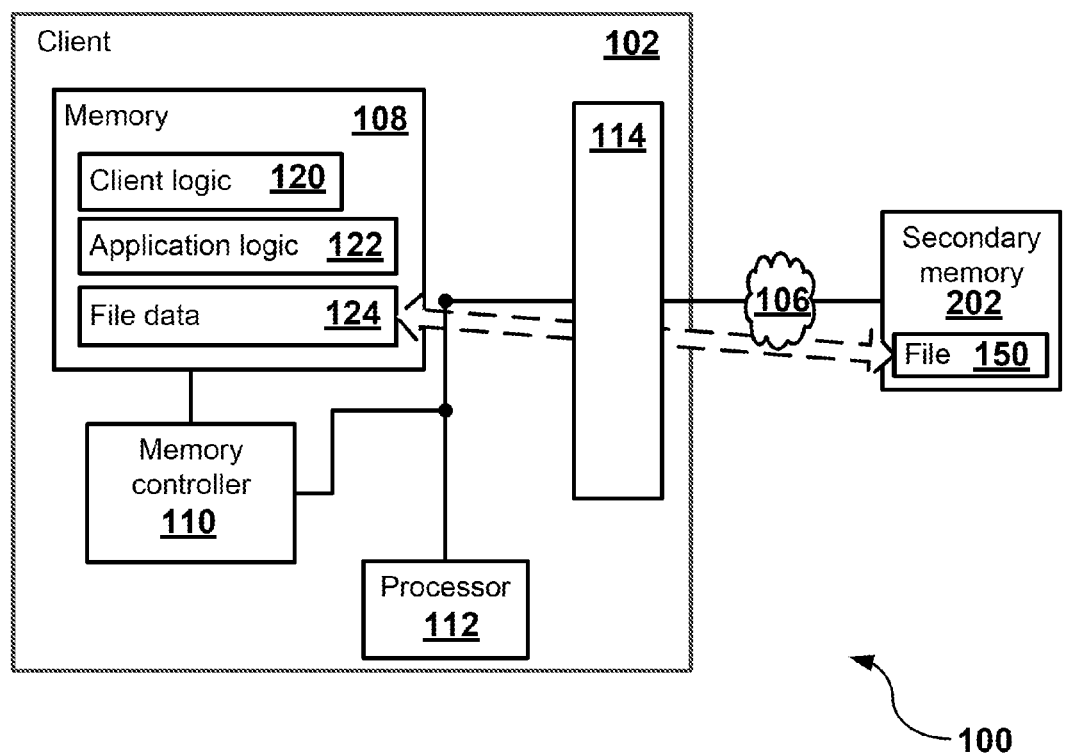
FIG. 3 illustrates a third example of a system to enable fork-safe memory allocation from memory-mapped files with anonymous memory behavior.

FIG. 3 illustrates a third example of the system 100 to enable fork-safe memory allocation from memory-mapped files with anonymous memory behavior. The system 100 illustrated in FIG. 3 includes the client 102 and the secondary memory 202, where the secondary memory 202 is external to the client 102 and includes the file 150. The secondary memory 202 may be in communication with the client 102 via the one or more interconnects 106. The secondary memory 202 may be a storage device or storage system, such as a SCSI disk, a Fibre-Channel-attached RAID array, an SSD, a flash memory device, and/or any other type of external storage.

Figure 4:
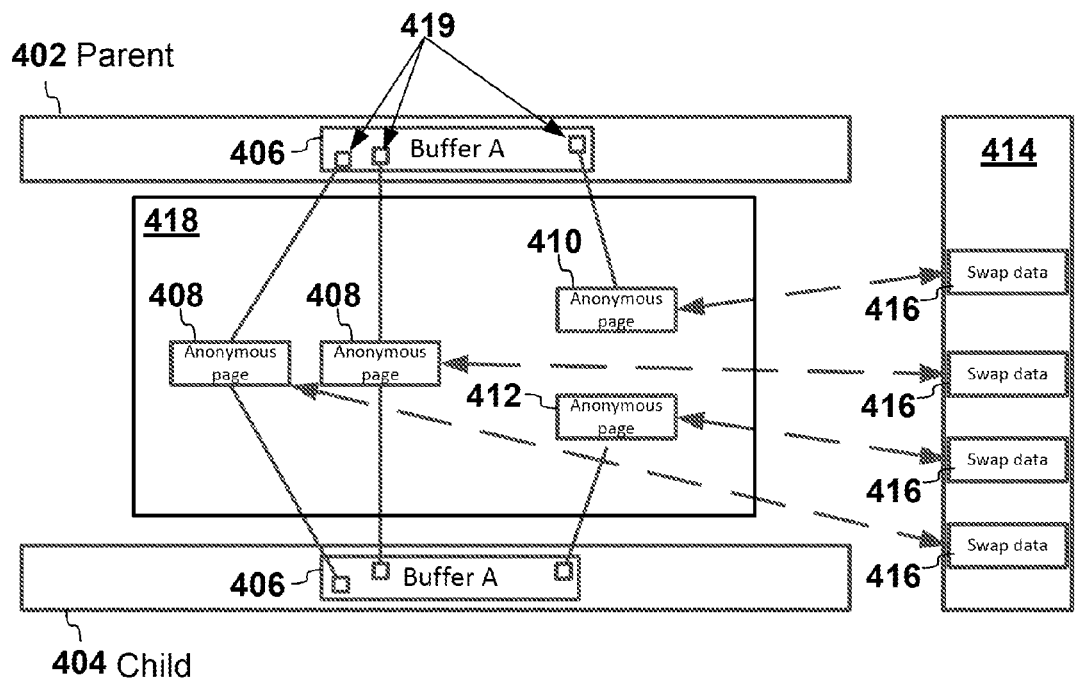
FIG. 4 illustrates a data flow diagram of an example system to enable fork-safe allocation of anonymous memory.

FIG. 4 illustrates an example data flow diagram of the system 100 to enable fork-safe allocation in which a parent process virtual address space 402 and a child process virtual address space 404 reference anonymous memory 418 backed by swap memory 414 that is, in turn, backed by external memory. The system 100 may include a parent process and a child process that execute in the client 102. The parent and the child processes have the corresponding parent process virtual address space 402 and child process virtual address space 404, respectively. The parent process virtual address space 402 may include a buffer 406. A subset of the contents of the buffer 406 may be stored in one or more anonymous memory pages 408. The anonymous memory pages 408 may be referenced by the parent process virtual address space 402 at locations 419 within the buffer 406 mapped to the anonymous memory pages 408. The locations 419 within the buffer 406 may be virtual addresses and/or offsets from a starting virtual address of the buffer 406. The child process may be created. Attempts to read at locations within the parent process virtual address space 402 that do not reference one of the anonymous memory pages 408 may be directed to a page (not shown) with known content, such as a page full of zeroed data. Attempts to write to locations within the parent process virtual address space 402 that do not reference one of the anonymous memory pages 408 may trigger a page fault handler. In response, the page fault handler may allocate a second anonymous memory page 410 and/or initialize the second anonymous memory page 410 with known data (such as all zeros) prior to allowing the write to proceed with the second anonymous memory page 410.

In response to the parent process forking, the child process may be created; the child process virtual address space 404 may be created; and the contents of the parent process virtual address space 402 may be replicated in the child process virtual address space 404. As such, some of the anonymous memory pages 408 previously referenced by the parent process virtual address space 402 may also be referenced by the child process virtual address space 404. The anonymous memory pages 408 that are shared between two or more processes may be marked read only, such that attempts to write to the data included in the anonymous memory pages 408 may trigger a page fault handler. In response, the page fault handler may allocate a third anonymous memory page 412 and duplicate the data of the faulting anonymous memory page into the third anonymous memory page 412. Upon completion of the page fault handler, the parent process virtual address space 402 and the child process virtual address space 404 may reference different anonymous memory pages for the same location within the buffer 406.

The anonymous memory pages 408, 410, and 412 may be backed by the swap memory 414, such as a swap file, a swap device, a swap partition, etc. The swap memory 414 may be included in the secondary memory 202 of the client 102. Alternatively or in addition, the swap memory 414 may be included in the memory 130 of the memory appliance 104, such as by using the memory swapping interface described in U.S. non-provisional patent application Ser. No. 14/530,908, filed Nov. 3, 2014, entitled "DYNAMICALLY PROVISIONABLE AND ALLOCATABLE EXTERNAL MEMORY," or in U.S. non-provisional patent application Ser. No. 14/554,655, filed Nov. 26, 2014, entitled "PROVISIONING OF EXTERNAL MEMORY."

When an anonymous memory page is said to be backed by the swap memory 414, it may mean that the data of the anonymous memory page may be written to the swap memory 414 as determined by an operating system and/or other logic. For example, the operating system may determine that the memory occupied by the anonymous memory page is needed for other purposes and may write the data of the anonymous memory page to a portion of the swap memory 414 prior to reusing the memory of the anonymous memory page for other purposes. When the memory of the anonymous memory page is reused for other purposes, one or more of the virtual address spaces 402 and 404 that reference the anonymous memory page may be updated to reference the swap memory 414. Each of the anonymous memory pages 408, 410, and 412 may be mapped to corresponding portions 416 of the swap memory 414. Alternatively or in addition, each portion of the virtual address spaces 402 and 404 may be mapped to the corresponding portions 416 of the swap memory 414.

Figure 5:
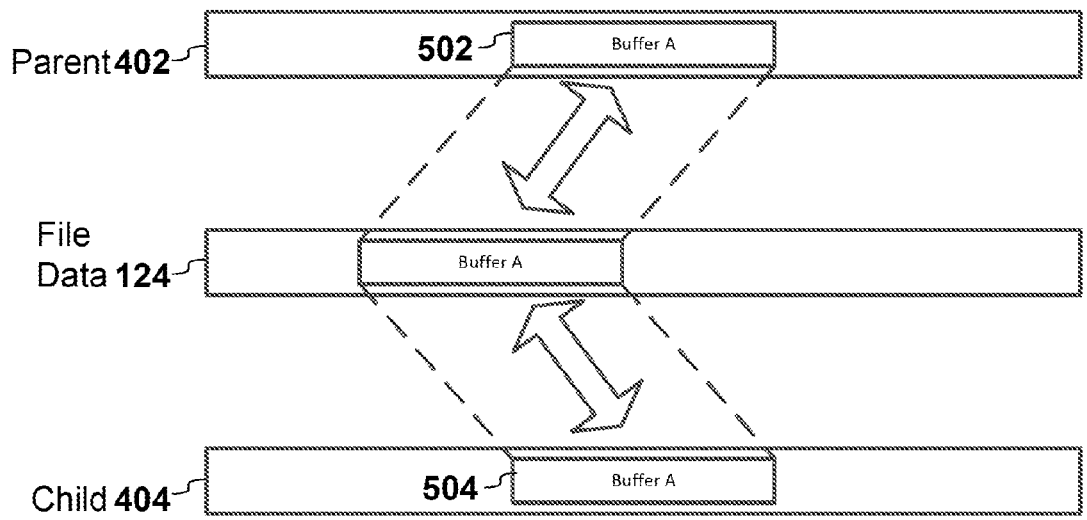
FIG. 5 illustrates a data flow diagram of an example system providing shared access to a portion of a memory-mapped file.

FIG. 5 illustrates an example data flow diagram of the system 100 to enable fork-safe allocation in which shared mode access is provided to a portion of the memory-mapped file backed by external memory. The portion of the memory-mapped file that is accessed includes the file data 124 in the memory 108 of the client 102. The system 100 may include a parent process and a child process that execute in the client 102. The parent and the child processes have the corresponding virtual address spaces 402 and 404, respectively. The parent process virtual address space 402 may include a buffer 502. The contents of the buffer 502 may be stored in a portion of the file 150. Attempts to read or write at locations within the parent process virtual address space 402 that do not have a corresponding page in the file data 124 may trigger a page fault handler. In response, the page fault handler may allocate a page, read data from the file 150 at an offset corresponding to the virtual address, and/or may include the page in the file data 124 in the memory 108. Subsequent attempts to read or write at the same location may use the page in the file data 124 instead of triggering a page fault.

In response to the parent process forking, the child process may be created; the child process virtual address space 404 may be created; and the contents of the parent process virtual address space 402 may be replicated in the child process virtual address space 404. As such, a buffer 504 in the child process virtual address space 404 that corresponds to the buffer 502 in the parent process virtual address space 402 may refer to the same portion of the file 150 as the buffer 502 in the parent process virtual address space 402. Attempts to write to a location in either virtual address space 402, 404 may cause the contents of the portion of the file 150 to be changed. Subsequently reading from a corresponding location in the virtual address space 402, 404 that was not written to returns the changed contents.

Pages of the file data 124 may be backed by the file 150. When a page of the file data 124 is said to be backed by the file 150, it means that the data of page within the file data 124 may be written back to the file 150 as determined by an operating system and/or other logic. For example, the operating system may determine that the memory occupied by the page is needed for other purposes and may write the data of the page to the corresponding portion of the file 150 prior to reusing the memory for other purposes. When the memory of the page is reused for other purposes, one or more of the virtual address spaces 402 and 404 that reference the memory page may remove the reference to the page and/or may reference the file 150 instead.

Figure 6:
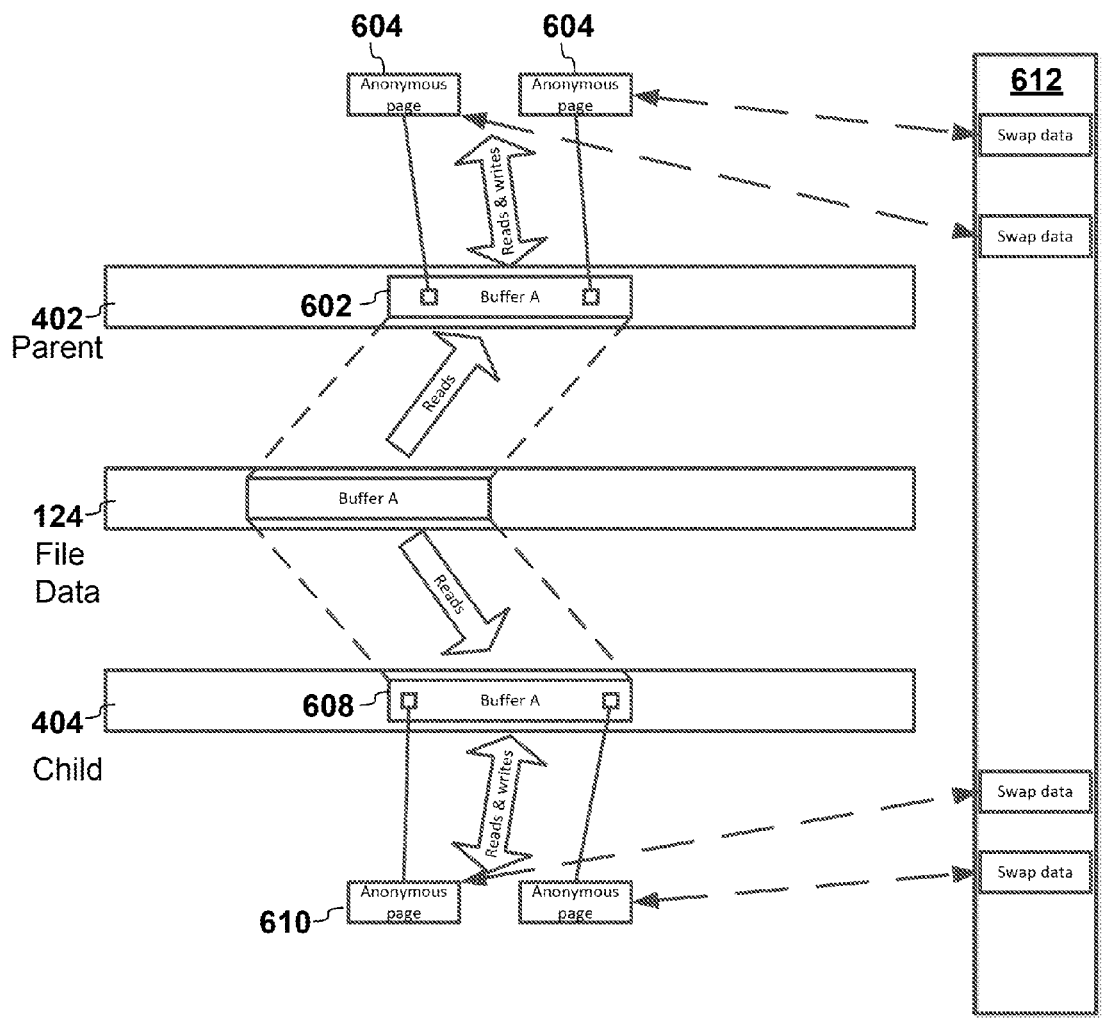
FIG. 6 illustrates a data flow diagram of an example system to enable fork-safe allocation of file-backed memory using anonymous memory pages.

FIG. 6 illustrates an example data flow diagram of the system 100 to enable fork-safe allocation in which private mode access to a portion of the memory-mapped file is provided using anonymous memory pages, and the memory-mapped file and/or swap memory is backed by external memory. The portion of the memory-mapped file that is initially accessed includes the file data 124 in the memory 108 of the client 102. The system 100 may include a parent process and a child process that execute in the client 102. The parent and child processes may have the corresponding virtual address spaces 402 and 404, respectively. The parent process virtual address space 402 may include a buffer 602. The contents of the buffer 602 may be stored in a portion of the file 150 and/or in one or more anonymous memory pages 604. Attempts to read at locations within the parent process virtual address space 402 that do not reference an anonymous memory page and that do not have a corresponding page in the file data 124 may trigger a page fault handler. In response, the page fault handler may allocate a page, read data from the file 150 at an offset corresponding to the virtual address, and/or may include the page in the file data 124 in the memory 108. Attempts to write at locations within the parent process virtual address space 402 that do not reference an anonymous memory page may trigger the page fault handler. In response, the page fault handler may allocate an anonymous memory page, may read the corresponding data from the file 150 into the anonymous memory page (or copy it from a corresponding page in the file data 124), and/or may include a reference to the anonymous memory page in the parent process virtual address space 402 prior to allowing the write to proceed with the anonymous memory page.

In response to the parent process forking, the child process may be created; the child process virtual address space 404 may be created; and the contents of the parent process virtual address space 402 may be replicated in the child process virtual address space 404. As such, a buffer 608 in the child process virtual address space 404 may refer to the same portion of the file 150 as the corresponding buffer 602 in the parent process virtual address space 402 and/or the same anonymous memory pages 604 referenced by the parent process virtual address space 402 prior to the forking. The anonymous memory pages 604 that are shared between two or more processes may be marked read only, such that attempts to write to the data included in any of the anonymous memory pages 604 may trigger a page fault handler. In response, the page fault handler may allocate a third anonymous memory page 610 and duplicate the data of the faulting anonymous memory page into the third anonymous memory page 610. The virtual address space 402, 404 through which the data is written triggering the page fault handler, for example, the child process virtual address space 404, may reference the third anonymous memory page 610. Upon completion of the page fault handler, the parent process virtual address space 402 and the child process virtual address space 404 may reference different anonymous memory pages for the same location within the buffer 602 or 608.

As described elsewhere herein, pages of the file data 124 may be backed by the file 150. As described elsewhere herein, the anonymous memory pages 604 and 610 may be backed by swap memory 612.

Figure 7:
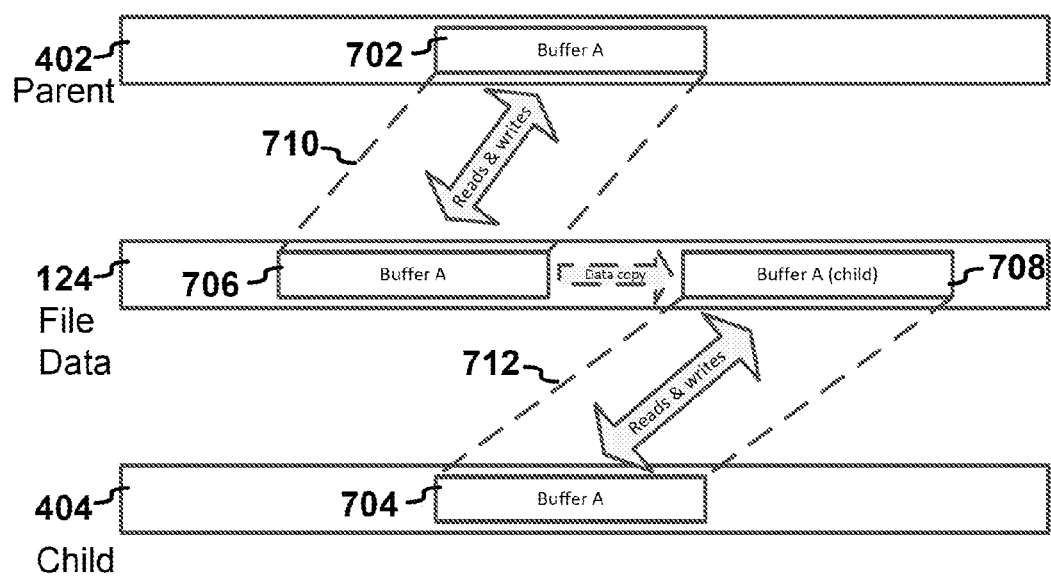
FIG. 7 illustrates a data flow diagram of an example system to enable fork-safe memory allocation from memory-mapped files with anonymous memory behavior.

FIG. 7 illustrates an example data flow diagram of the system 100 to enable fork-safe memory allocation from memory-mapped files with anonymous memory behavior. The system 100 may include a parent process and a child process that execute on the client 102. The parent and child processes may have the corresponding virtual address spaces 402 and 404, respectively. The parent process virtual address space 402 may include a buffer 702. The contents of the buffer 702 may be stored in a portion of the file 150. Attempts to read or write at locations within the parent process virtual address space 402 or other virtual address space that do not have a corresponding page in the file data 124 may trigger a page fault handler. In response, the page fault handler may allocate a page, read data from the file 150 at an offset corresponding to the virtual address, and/or may include the page in the file data 124 in the memory 108. Subsequent attempts to read or write at the same location may use the page in the file data 124 instead of triggering a page fault.

In response to the parent process forking, the child process may be created; the child process virtual address space 404 may be created; and/or one or more buffers 704 may be created within the child process virtual address space 404 at the same location as corresponding buffers within the parent process virtual address space 402. The buffers 704 in the child process virtual address space 404 may reference different portions of the file 150 than the corresponding buffers within the parent process virtual address space 402. Data may be copied from portions 706 of the file 150 (and/or of the file data 124) that correspond to the buffers 702 of the parent process virtual address space 402 to portions 708 of the file 150 (and/or of the file data 124) that correspond to the buffers 704 of the child process virtual address space 404 as described elsewhere in this document. Since the buffer 702 of the parent process virtual address space 402 and the buffer 704 of the child process virtual address space 404 reference different portions of the file 150 (and/or of the file data 124), the mappings 710 and 712 may be considered in-file private mappings, where each mapping 710 and 712 provides an independent (or private) view of the corresponding buffer 706 and 708 allocated to the corresponding process. In contrast, where traditional private mappings of memory-mapped files provide independent views of buffers 602 and 608 using anonymous memory pages 604 and 610, in-file private mappings provide independent views of buffers 702 and 704 using the file 150 (and/or the file data 124).

As described elsewhere herein, pages of the file data 124 may be backed by the file 150. The mappings 710 and 712 that map virtual addresses of the buffers 702, and 704 in the virtual address spaces 402, 404 to the corresponding portions 706, 708 of the file 160 may be included in the memory 108 of the client 102.

The system 100 to enable fork-safe memory allocation from memory-mapped files with anonymous memory behavior may be embodied in many ways. Several such embodiments are described herein as examples.

In a first embodiment of the system 100, the client logic 120 may include a kernel driver and/or a user library. The user library may include a memory allocation library, such as libc malloc, glibc malloc, dlmalloc, ptmalloc, tcmalloc, jemalloc, hoard, mmap( ) or any other memory allocation library. The kernel driver may, for example, include the following interfaces and/or programmatic procedures:

A memory allocation interface
A memory freeing interface
A pre-fork notification interface
An intra-fork notification handler
A segmentation fault signal notification interface
A post-fork notification interface
A file descriptor close interface The memory allocation interface may be an interface through which the user library may request additional memory from the kernel driver. The memory allocation interface may select a portion of the file 150 to use as a backing store for the allocation request. The memory allocation interface may map the selected portion of the file 150 into the virtual address space 402, 404 of the user process accessing the memory allocation interface. The selected portion may be mapped in such a way to indicate to the operating system that the mapping is not to be copied to a child process during a fork operation. The memory allocation interface may block or return a busy status if kernel driver data structures indicate that a fork is in progress.

In some examples, at the time the memory allocation interface is invoked, the file 150 may already have been mapped to a range of virtual addresses in the virtual address space 402, 404. In such examples, the memory allocation interface may map the selected portion of the file 150 to a virtual address or multiple virtual addresses in the range of virtual addresses previously mapped to the file 150. In alternative examples, at the time the memory allocation interface is invoked, the file 150 may not have been mapped yet. In such examples, the memory allocation interface may map the file 150 to a range of virtual addresses in the virtual address space 402, 404, and then map the selected portion of the file 150 to a virtual address or multiple virtual addresses in the range of virtual addresses mapped to the file 150.

The memory allocation interface may update a bitmask or other data structure to indicate that the selected portion is to be zeroed prior to being presented to the user process. For example, for each corresponding unit of granularity, such as a page, the allocation interface may set a corresponding bit in a bitmask. A file reading interface may check the bitmask or other data structure to determine whether to read the corresponding page from the file 150 or to zero the page instead. A file writing interface and/or a page fault interface may clear the corresponding bits when writing to the file 150 or when allowing a portion of the file data 150 to be written to.

Additionally, the memory allocation interface may perform initialization. Initialization may include creating one or more memory mappings in such a way to indicate to the operating system that the mapping is to be copied to the child process during a fork operation. The one or more mappings may be configured to use the intra-fork notification handler as its virtual-memory-area "open" interface, which the operating system may execute during a fork operation. Alternatively or in addition, initialization may be performed by an alternative interface or by one or more of the interfaces as needed. For example, one or more (or all) of the other interfaces of the kernel driver may check whether initialization has been performed and, if not, may perform initialization. Alternatively or in addition, there may be a separate initialization interface that performs initialization.

The file 150 may be a regular file in a filesystem, a special file, a block device file, a character device file, a pseudo file, any other type of file, and/or any other interface that can be memory-mapped. The file 150 may be backed by any medium capable of holding data, such as a solid state memory, a random access memory (RAM), a dynamic random access memory (DRAM), a static random access memory (SRAM), a flash memory, a read-only memory (ROM), an electrically erasable programmable read-only memory (EEPROM), a flash memory, a phase change memory, a memristor memory, a solid state storage device, a magnetic disk, tape, other media, etc. In one example, the file 150 may include an interface to enable memory mapping to a peripheral that enables access to solid state memory, such as a PCIe-attached flash-memory peripheral. In another example, the file 150 may include an interface, such as an interface in a virtual filesystem, that provides access to a corresponding area of the memory 130 in the memory appliance 104. As such, reading or writing data to a specified offset within the file 150 may cause the virtual filesystem to read or write data from the corresponding offset within the memory 130 of the memory appliance 104. Similarly, when the file 150 is memory-mapped, page faults in memory backed by the file 150 may cause the virtual filesystem to read data from the corresponding offset within the memory 130 of the memory appliance 104, and/or writeback to the file 150 may cause the virtual filesystem to write data to the corresponding offset within the memory 130 of the memory appliance 104. The memory appliance 104 may be external to the computing system, such as the client 102, that is executing the kernel driver and/or the virtual filesystem, such as described in U.S. non-provisional patent application Ser. No. 14/530,908, filed Nov. 3, 2014, entitled "DYNAMICALLY PROVISIONABLE AND ALLOCATABLE EXTERNAL MEMORY," or in U.S. non-provisional patent application Ser. No. 14/554,655, filed Nov. 26, 2014, entitled "PROVISIONING OF EXTERNAL MEMORY."

The memory freeing interface may unmap an identified portion 702 or 704 of the virtual address space 402, 404 and/or may update internal state and/or kernel driver data structures to indicate that the portion 706 or 708 of the file 150, corresponding to the identified portion 702 or 704 of the virtual address space 402, 404, is available for future allocation. The memory freeing interface may block or return a busy status if the kernel driver data structures indicate that a fork is in progress.

The pre-fork notification interface may prepare a child file descriptor to be used by the child process. For example, the pre-fork notification interface may store a process identifier for the parent process in a memory buffer associated with the child file descriptor. Alternatively, or in addition, the pre-fork notification interface may set a state and/or one or more indicators of the kernel driver data structures indicating the progress of activities described elsewhere in this document, such as activities performed by the post-fork notification interface, the intra-fork notification handler, and/or the segmentation fault signal notification interface. The kernel driver data structures may include an indication that a fork is in progress. The pre-fork notification interface may block or return a busy status if the kernel driver data structures indicate that a fork is already in progress, such as by another thread of the parent process.

The intra-fork notification handler may check whether it is called as part of a fork operation. For example, the intra-fork notification handler may compare the virtual address space 402, 404 of the copied virtual memory area with the virtual address space 402, 404 of the currently executing process. If the two virtual address spaces differ, then the intra-fork notification handler may conclude that it was called as part of a fork operation.

When called as part of a fork operation, the intra-fork notification handler may update kernel driver data structures to reflect the intention to copy the current state of the parent process's memory to the child process's memory. In one example, the intra-fork notification handler may select one or more portions of the file 150 to use as a backing store for the child process corresponding to one or more of the memory areas that had been allocated to the parent process previously. The kernel driver data structures may include one or more linked lists or trees to associate parent process memory areas 706 with one or more child process areas 708. A memory area may be the child process memory area 708, linked to the parent process memory area 706 of the parent process that forked to create it, and/or the parent process memory area 708, linked to one or more child process memory areas (not shown) of the child processes that were forked from the process that owns the memory area 708.

The intra-fork notification handler may copy data associated with each parent process memory area 706 to the corresponding child process memory area 708. For example, if data is located in the file data 124 for the offset in the file 150 corresponding to the parent process memory area 706, the intra-fork notification handler may copy the file data 124 to a new location in the file data 124, at an offset in the file 150 corresponding to the corresponding child process memory area 708. If data is not located in the file data 124 for the offset in the file 150 corresponding to the parent process memory area 706, the intra-fork notification handler may read the corresponding data from the file 150 from the offset in the file 150 corresponding to the parent process memory area 706. The read data may be read into the new location in the file data 124, at an offset in the file 150 corresponding to the corresponding child process memory area 708. Alternatively or in addition, the intra-fork notification handler may copy the corresponding data from the offset in the file 150 corresponding to the parent process memory area 706 to the offset in the file 150 corresponding to the corresponding child process memory area 708. For example, the intra-fork notification handler may send a notification to the memory appliance 104 instructing the memory appliance 104 to copy data from a first portion of the memory 130 of the memory appliance 104 to a second portion. Alternatively, or in addition, the intra-fork notification handler may update metadata reflecting the desired contents of the file 150 at the offset corresponding to the corresponding child process memory area 708. For example, if the kernel driver is using a bitmask or other data structure to indicate whether a corresponding portion of the file is to be zeroed before being presented to the user process, the kernel driver may copy the portion of the bitmask or other data structure corresponding to the parent process memory area 706 to the portion of the bitmask or other data structure corresponding to the child process memory area 708.

The segmentation fault signal notification interface and/or the post-fork notification interface may determine whether it was called from the parent process or the child process and/or may perform different steps for each. For example, the segmentation fault signal notification interface and/or the post-fork notification interface may include an indication from the currently executing process, whether the process is the parent process or the child process. Alternatively, or in addition, the segmentation fault signal notification interface and/or the post-fork notification interface may compare the currently running process's process identifier with the parent process identifier that was saved by the pre-fork notification interface.

The segmentation fault signal notification interface, if executed by the child process, may unmap the one or more memory mappings associated with the intra-fork notification handler and/or may re-map them using the child process's file descriptor. Alternatively or in addition, the segmentation fault signal notification interface may create one or more memory mappings 712 associated with the one or more portions 708 of the file 150 that were selected by the intra-fork notification handler to use as a backing store for the child process. If the state and/or the one or more indicators indicate that any of these steps have already been performed, then the segmentation fault signal notification interface may skip these steps.

For the parent process, the post-fork notification interface may update the state and/or indicators to indicate that a fork is no longer in progress.

For the child process, the post-fork notification interface may unmap the one or more memory mappings associated with the intra-fork notification handler and/or re-map them using the child process's file descriptor. Alternatively or in addition, the post-fork notification interface may create one or more memory mappings 712 associated with the one or more portions 708 of the file 150 that were selected by the intra-fork notification handler to use as a backing store for the child process. If the state and/or the one or more indicators indicate that any of these steps have already been performed, then the post-fork notification interface may skip these steps. If the post-fork notification interface determines that an error has occurred that would prevent the child process from having the desired virtual memory mappings 712, it may cause the child process to exit, such as by sending a signal to the child process.

The file descriptor close interface may be executed by the operating system when the last reference to a file descriptor is closed. The file descriptor close interface may, for each previously allocated portion 706 or 708 of the file 150 that was allocated by the allocation interface using the file descriptor but that hasn't been freed by the freeing interface, update internal state and/or kernel driver data structures to indicate that the portion 706 or 708 of the file 150 is available for future allocation.

The user library may be configured to open the file 150 using the kernel driver to obtain a first file descriptor and/or to register one or more at-fork notification handlers with a system library and/or the operating system. At-fork notification handlers may include a pre-fork notification handler, a parent post-fork notification handler, and/or a child post-fork notification handler.

The user library may be configured to use the interfaces of the kernel driver to obtain and/or free slabs of memory. For example, the user library may use the memory allocation interface to obtain slabs of memory and/or may use the memory freeing interface to free slabs of memory that were obtained from the memory allocation interface. The user library may use the first file descriptor to call the memory allocation interface and/or the memory freeing interface.

The pre-fork notification handler may register a segmentation fault signal handler with a system library and/or the operating system. When registering the segmentation fault signal handler, the pre-fork notification handler may obtain an original segmentation fault signal handler from the system library and/or the operating system. The pre-fork notification handler may also open the file using the kernel driver to obtain a second file descriptor. The pre-fork notification handler may use the first file descriptor to call the pre-fork notification interface of the kernel driver and/or may provide the second file descriptor to the pre-fork notification interface to use as the child file descriptor.

The segmentation fault signal handler may be called by the system library and/or the operating system when the currently executing process attempts to access a portion of its virtual address space 402, 404 that has no memory mapped at that address. When called, the segmentation fault signal handler may call the segmentation fault signal notification interface of the kernel driver. Alternatively, or in addition, the segmentation fault signal handler may re-install the original segmentation fault signal handler.

The parent post-fork notification handler may use the first file descriptor to call the post-fork notification interface of the kernel driver. Alternatively, or in addition, the parent post-fork notification handler may close the second file descriptor and/or may re-install the original segmentation fault signal handler.

The child post-fork notification handler may re-install the original segmentation fault signal handler and/or may close the first file descriptor. Alternatively, or in addition, the child post-fork notification handler may use the second file descriptor to call the post-fork notification interface of the kernel driver. The child post-fork notification handler may, in some examples, update internal state and/or variables of the user library such that, henceforth, the second file descriptor will be used for all purposes for which the first file descriptor would have been used.

The user library may be configured to override and/or take the place of interfaces and/or programmatic procedures that would otherwise be provided by the system library. For example, the user library may export a malloc handler and/or a free handler. In another example, the user library may export an mmap hander and/or an munmap handler. In another example, the user library may export a brk handler and/or an sbrk handler. In other examples, the user library may export any other handler that is commonly used to allocate memory for application logics. The user library may be loaded using a mechanism that causes its exported symbols to take precedence over symbols exported by other libraries, including the system library. For example, the user library may be loaded using a LD_PRELOAD mechanism. Alternatively, or in addition, the user library may be statically compiled into an application. Alternatively, or in addition, the user library may be installed in place of a library that provides one or more of the same handlers as the user library. Alternatively, or in addition, the user library may be combined with and/or may be part of another library, such as the system library.

The memory allocation interface may include additional logic to support the exported handlers of the user library. For example, the memory allocation interface may include logic to perform tasks that would otherwise be done by an mmap handler and/or an mmap system call, such as memory mapping one or more portions of one or more files other than the file 150. In another example, the memory allocation interface may include logic to map anonymous memory, such as when specifically requested by the application logic and/or when the memory allocation request cannot be satisfied with the available portions of the file 150. In another example, the memory allocation interface may include logic to unmap portions of the virtual address space and re-map them to a different file (such as the file 150), to a different portion of the same file, and/or to anonymous memory, such as may be performed by mmap with a MAP_FIXED option.

Alternatively or in addition, the memory freeing interface may include additional logic to support the exported handlers of the user library. For example, the memory freeing interface may include logic to perform tasks that would otherwise be done by an munmap handler and/or an munmap system call, such as unmapping one or more portions of the virtual address space that are not associated with the file 150 (such as memory mappings for one or more files other than the file 150 and/or memory mappings for anonymous memory). For example, the memory freeing interface may be used to unmap one or more portions of a shared library, such as mayotherwise be done via munmap. As such, the memory freeing interface may provide a transparent mechanism to free and/or unmap any memory mappings created by mmap, not limited to the memory mappings created by the memory allocation interface.

Alternatively, or in addition, the system library may be modified to provide all of or a portion of the functionality of the user library, and/or to make all of or a portion of the functionality of the user library not necessary. For example, the system library may be modified to provide an interface to execute a new post-fork handler immediately after forking in the child process and/or before the system library attempts to access any memory obtained by the user library. The new post-fork handler may perform all of or a portion of the functionality of the child post-fork handler. With the new post-fork handler in use, the user library may not need to include a segmentation fault notification handler and/or the kernel driver may not need to provide a segmentation fault notification interface.

Alternatively, or in addition, the user library and/or the allocation interface may be configured to identify memory allocation attempts from the system library and/or may service some or all of these requests using standard anonymous memory. For example, the user library may inspect the stack frames of a calling process to identify if the calling process is the system library or any library which might later attempt to use the memory prior to the child post-fork handler being executing. By using standard anonymous memory for system library memory requests, the user library may not need to include a segmentation fault notification handler and/or the kernel driver may not need to provide a segmentation fault notification interface.

Alternatively, or in addition, the user library may be configured to provide alternate interfaces and/or programmatic procedures that may be similar to interfaces and/or programmatic procedures provided by other libraries. For example the user library may export a malloc handler and/or a free handler using alternate naming. Alternatively, or in addition, the user library may be configured to provide alternate interfaces and/or programmatic procedures that differ versus interfaces and/or programmatic procedures provided by other libraries. For example, the user library may export a memory allocation handler that provides enhanced capabilities versus the interfaces and/or programmatic procedures provided by other libraries, such as the ability to specify a preferred file to use for allocating the memory. Alternatively, or in addition, the user library may be configured to provide additional interfaces and/or programmatic procedures that are not provided by other libraries, such as the ability to request that previously allocated memory be migrated from one file to another and/or from one location in the file to another, etc.

Figure 8:
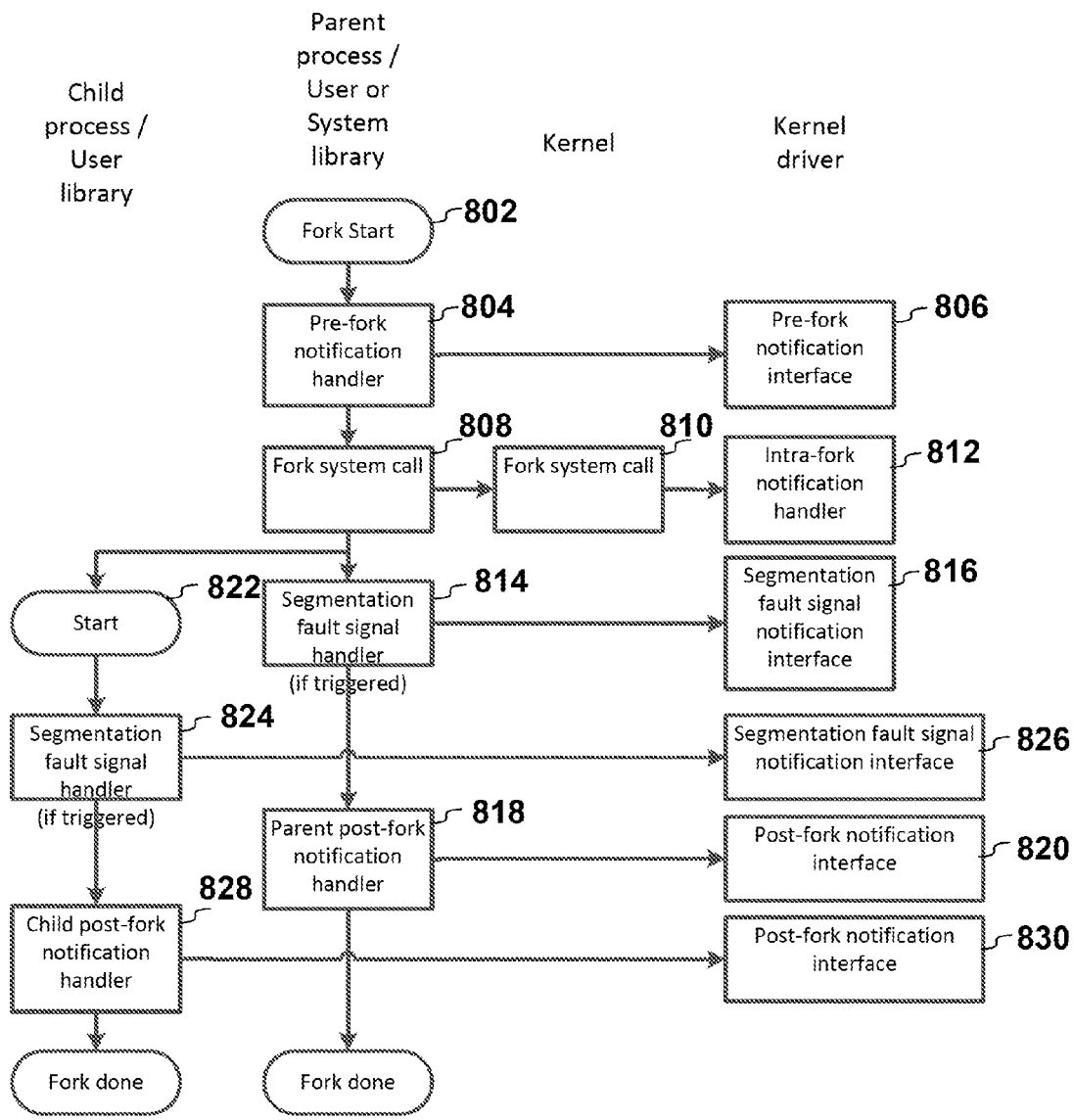
FIG. 8 illustrates a flow diagram of an example of logic of a system providing fork-safe allocation of anonymous memory.

FIG. 8 illustrates a flow diagram of an example of overall logic of the system 100 during a fork operation. In the example illustrated in FIG. 8, the kernel may not require any changes from a standard kernel. The application logic 122 may request (802) a fork operation with the system library, starting the process illustrated in FIG. 8. The system library may begin by executing (804) the pre-fork notification handler of the user library. The pre-fork notification handler may perform the actions described elsewhere in this document and/or may trigger (806) the pre-fork notification interface of the kernel driver.

Upon completion of the pre-fork notification handler, the system library may execute (808) the fork system call (or an equivalent system call) with the kernel (810). In response, the kernel may execute (812) the intra-fork notification handler via the mechanisms described elsewhere in this document.

Upon completion of the fork system call, the system library may perform some activities related to the fork operation in the parent process. If any of these activities (or any activities in other threads of the parent process) trigger a segmentation fault, the segmentation fault signal handler may be executed (814) with the user library. The segmentation fault signal handler may perform the actions described elsewhere in this document and/or may trigger (816) the segmentation fault signal notification interface of the kernel driver.

Upon completion of activities related to the fork operation in the parent process, the system library may execute (818) the parent post-fork notification handler. The parent post-fork notification handler may perform the actions described elsewhere in this document and/or may trigger (820) the post-fork notification interface of the kernel driver. Upon completion of the parent post-fork notification handler, the parent process may proceed as if the fork operation were complete.

Also upon completion of the fork system call (808), the child process may be started (822) by the kernel. Upon starting of the child process, the system library may perform some activities related to the fork operation in the child process. If any of these activities trigger a segmentation fault, the segmentation fault signal handler may be executed (824) with the user library. The segmentation fault signal handler may perform the actions described elsewhere in this document and/or may trigger (826) the segmentation fault signal notification interface of the kernel driver.

Upon completion of activities related to the fork operation in the child process, the system library may execute (828) the child post-fork notification handler. The child post-fork notification handler may perform the actions described elsewhere in this document and/or may trigger (830) the post-fork notification interface of the kernel driver. Upon completion of the child post-fork notification handler, the child process may proceed as if the fork operation were complete.

In a second embodiment, the kernel driver may be implemented such that it does not need to copy data using the intra-fork notification handler, may copy the data in a background process, and/or may copy the data at the time of a page fault.

For example, the intra-fork notification handler may update the page table entries in the parent process's virtual memory to mark all pages backed by the file as not writable. Doing so may cause future writes to these pages in the parent process to trigger a page fault handler. After updating the page table entries in the parent process's virtual memory, the intra-fork notification handler may flush all of or a portion of the translation lookaside buffer. For example, the intra-fork notification handler may flush the portion of the translation lookaside buffer corresponding to the parent process, the affected page table entries, and/or all page table entries.

Alternatively, or in addition, the segmentation fault signal notification interface and/or the post-fork notification interface (when executed by the child process) may update the page table entries and/or may configure the virtual memory mappings to mark all pages backed by the file 150 as not writable. Doing so may cause future writes to these pages in the child process to trigger the page fault handler.

The background process and/or the page fault handler may copy some or all of the data associated with a parent process memory area to the corresponding child process memory area, using the methods described for the intra-fork notification handler elsewhere in this document. The background process and/or the page fault handler may determine what data to copy using the kernel driver data structures, linked lists, and or trees that were updated by the intra-fork notification handler. For example, a page fault on a page that is backed by a child process memory area may cause the page fault handler to copy data from the file data 124 at an offset corresponding to the page's position in the parent process memory area. In another example, a page fault for writing to a page that is backed by a parent process memory area may cause the page fault handler to copy data from the page to one or more pages within the file data 124 corresponding to one or more child process memory areas that are associated with the parent process memory area.

To enable the page fault handler to more efficiently determine whether data needs to be copied, the kernel driver data structures may include one or more bitmasks or other data structures (such as a tree or list of memory areas forked from one process to another) to indicate whether a corresponding portion of the file 150 is to be copied to or copied from another portion of the file 150. In one example, a copy-to bitmask may indicate, for each page in the file 150, whether the true contents of the file 150 at that offset are located at that offset in the file 150, or if the contents are to be retrieved from elsewhere herein, such as from a parent process memory area linked to the child process memory area that corresponds to the bit offset within the bitmask. In another example, a copy-from bitmask may indicate, for each page in the file 150, whether the contents of the file 150 at that offset may be needed to reflect the true contents of the file 150 at a different offset, such as at one or more offsets in the file 150 corresponding to one or more child process memory areas associated with the parent process memory area that corresponds to the bit offset within the bitmask.

Alternatively, or in addition, the segmentation fault signal notification interface and/or the post-fork notification interface (when executed by the child process) may configure the virtual memory mappings to use the corresponding parent process memory areas as the source of data during a page fault and/or may install not-present page table entries (e.g. "file" page table entries) to achieve the same effect. Doing so may establish a non-linear file mapping for each virtual memory mapping in the child process. The page fault handler, upon handling a page fault for writing, may copy data as described elsewhere in this document, may remove the not-present page table entries, and/or may re-configure the virtual memory mappings to use the child memory areas as the source of data for one or more pages. When removing the not-present page table entries and/or when re-configuring the virtual memory mappings, the page fault handler may mark the corresponding one or more pages of the child memory areas as dirty.

Figure 9:
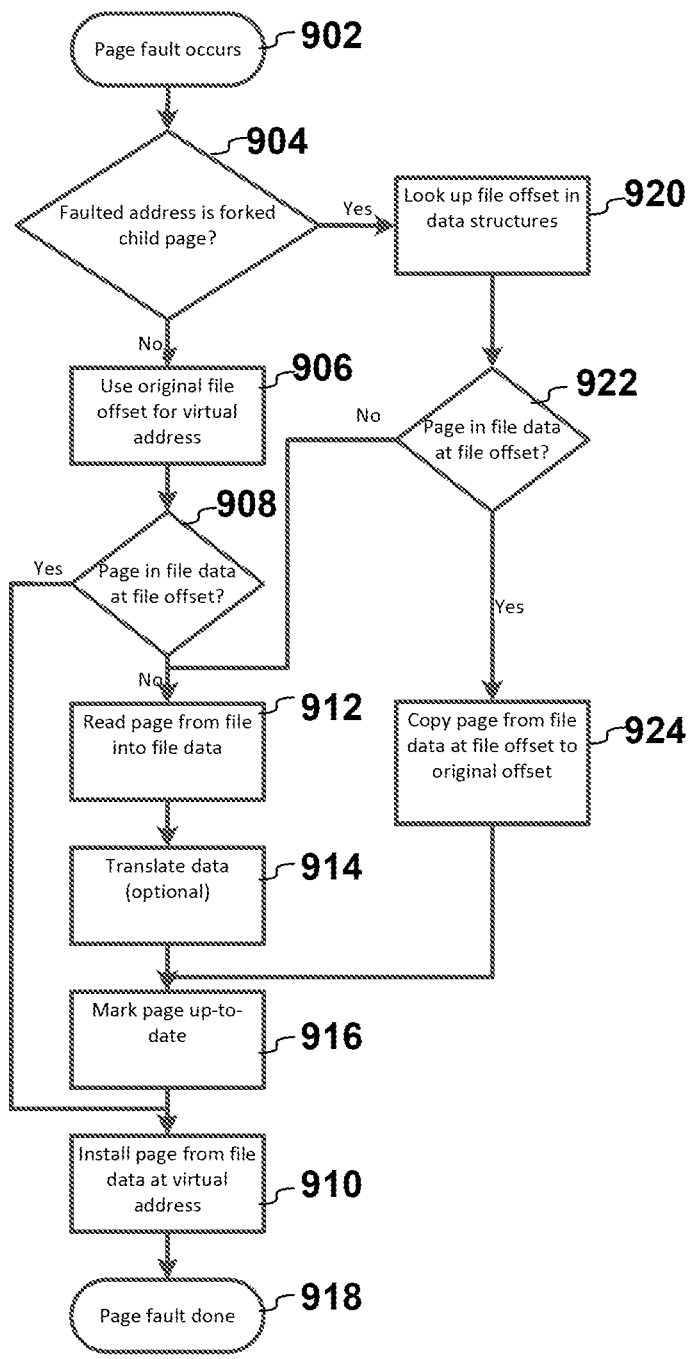
FIG. 9 illustrates a flow diagram of a first example client logic for a page fault handler of a second embodiment.

FIG. 9 illustrates a flow diagram of an example of the client logic 120 for the page fault handler of the second embodiment, which is an example of a delayed copy embodiment. The process may start (902) when a page fault occurs upon a faulted address. The client logic 120 may start by checking (904) if the faulted address is for a virtual memory area of the child process which was forked from a corresponding parent virtual memory area.

If the faulted address is not for a virtual memory area of the child process which was forked from a corresponding parent virtual memory area, the client logic 120 may use (906) the file offset corresponding to the virtual memory area of the currently executing process for the faulted address. The client logic 120 may proceed by checking (908) if there is a page in the file data 124 for the file offset. If so, the client logic may install (910) the page of the file data 124 into the virtual memory area for the faulted address and complete (918) the page fault. If not, the client logic 120 may allocate a page in the file data 124, read (912) data from the file 150 for the corresponding file offset into the page, optionally translate (914) the data (as described elsewhere in this document), mark (916) the page as up-to-date, install (910) the page of the file data 124 into the virtual memory area for the faulted address, and/or complete (918) the page fault.

If the faulted address is for a virtual memory area of the child process which was forked from a corresponding parent virtual memory area, the client logic 120 may look up (920) the file offset in the kernel driver data structures. In one example, the kernel driver data structures may indicate that the data for the faulted address is to be retrieved from a file offset corresponding to a corresponding parent process memory area. In another example, the kernel driver data structures may indicate a grandparent process memory area instead. The client logic 120 may proceed by checking (922) if there is a page allocated in the file data 124 for the file offset, such as the file offset corresponding to a corresponding parent process memory area. If there is a page allocated in the file data 124 for the file offset, the client logic 120 may copy (924) the file data 124 corresponding to the file offset into the allocated page, mark (916) the page as up-to-date, install (910) the allocated page into the virtual memory area for the faulted address, and/or complete (918) the page fault. If there is not a page allocated in the file data 124 for the file offset, the client logic 120 may allocate a page in the file data 124, read (912) data from the file 150 for the corresponding file offset into the page, optionally translate (914) the data (as described elsewhere in this document), mark (916) the page as up-to-date, install (910) the page of the file data 124 into the virtual memory area for the faulted address, and/or complete (918) the page fault.

Figure 11:
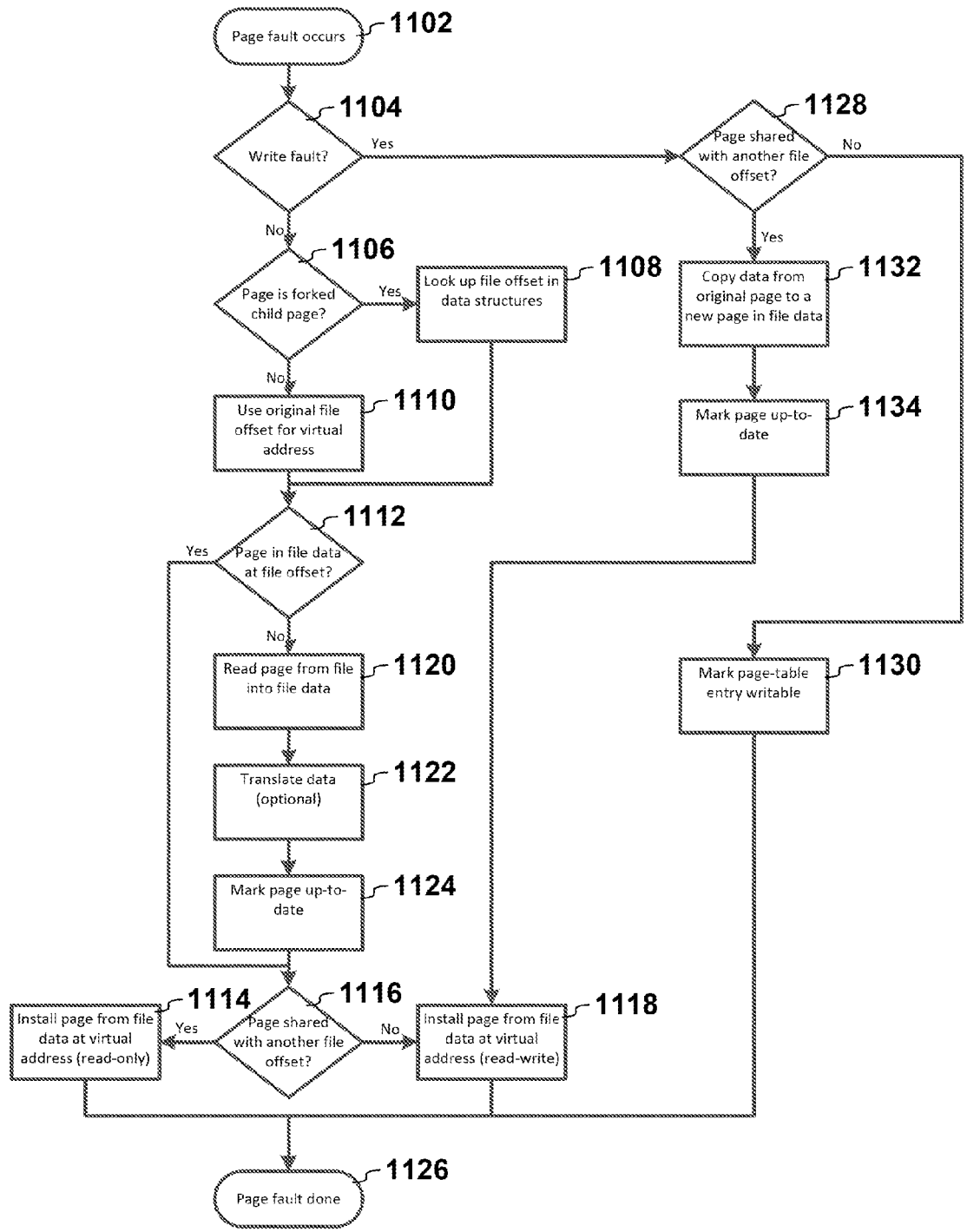
FIG. 11 illustrates a flow diagram of example client logic for a page fault handler of a third embodiment.

Alternatively or in addition, if the page fault is for a write operation for a virtual memory area of the parent process which has had one or more corresponding virtual memory areas forked for one or more corresponding child processes, the client logic may perform a copy-on-write operation, such as described for FIG. 11 (1128, 1130, 1132, 1134, and/or 1118).

In a third embodiment, the kernel driver may set up a copy-on-write mapping between the parent process virtual address space 402 and the child process virtual address space 404. For example, as in the second embodiment, the intra-fork notification handler may update the page table entries in the parent process virtual memory 402 to mark all pages backed by the file 150 as not writable and/or may flush all of or a portion of the translation lookaside buffer. The segmentation fault signal notification interface and/or the post-fork notification interface (when executed by the child process) may update the page table entries and/or may configure the virtual memory mappings to mark all pages backed by the file 150 as not writable.

Alternatively, or in addition, the page fault handler may install one or more pages from the parent memory area into one or more page table entries for the child memory area. The page table entries for the parent memory area and/or the page table entries for the child memory area may be configured as not writable. Doing so may cause future writes to these pages in the parent process or the child process to trigger the page fault handler. The page fault handler, when triggered by a write attempt on these pages, may install one or more new pages in the parent memory area and/or the child memory area in place of one or more of these pages, and may copy data as described elsewhere in this document. The intra-fork notification handler may update data structures (such as a tree or list of memory areas forked from one process to another) to enable the page fault handler to determine the original source of data within the file for each memory area.

Figure 10:
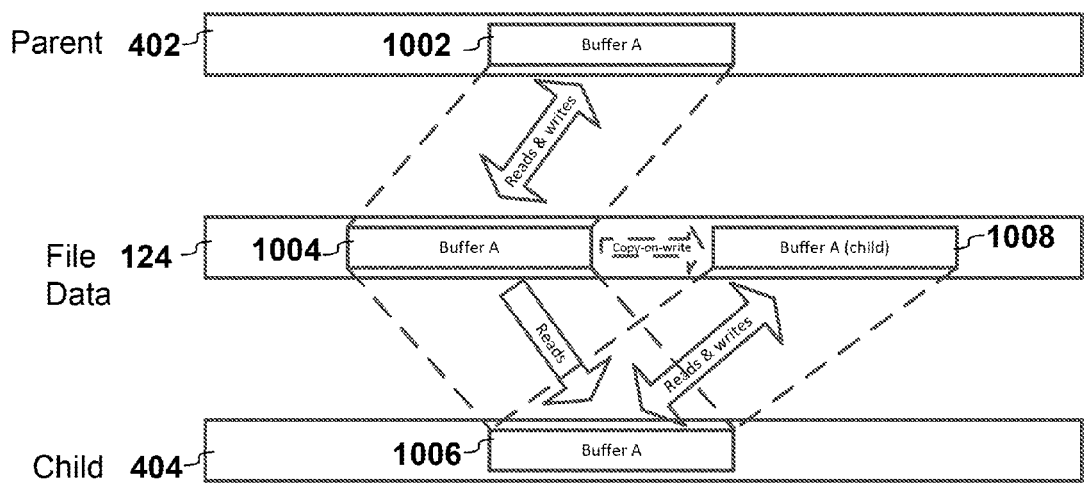
FIG. 10 illustrates a data flow diagram for a third embodiment.

FIG. 10 illustrates an example data flow diagram for the third embodiment, which is an example of a copy-on write embodiment. The system 100 may include a parent process and a child process. The parent process and the child process may have the parent process virtual address space 402 and the child process virtual address space 404, respectively. The parent process virtual address space 402 may include a buffer 1002 designated "Buffer A" in FIG. 10. The contents of the buffer 1002 may be stored in a portion of the file 150. Attempts to read at locations within the parent process virtual address space 402 that do not have a corresponding page in the file data 124 may trigger a page fault handler. In response, the page fault handler may allocate a page, read data from the file 150 at an offset corresponding to the virtual address, and/or may include the page in a buffer 1004 in the file data 124 in the memory 108. Subsequent attempts to read at the same location may use the page in the file data 124 instead of triggering a page fault.

In response to the parent process forking, the child process may be created, the child process virtual address space 404 may be created, and/or one or more buffers, such as a buffer 1006 designated "Buffer A" in FIG. 10, may be created within the child process virtual address space 404 at the same location as corresponding buffers within the parent process virtual address space 402, such as the buffer 1002 designated "Buffer A" in FIG. 10. The buffers in the child process virtual address space 404 may initially reference the same portions of the file 150 as the corresponding buffers within the parent process virtual address space 402. Attempts to read either the buffer 1002 in the parent process virtual address space 402 or the buffer 1006 in the child process virtual address space 404 may read from the location in the file data 124 corresponding to the parent process buffer, namely, the buffer 1004 designated "Buffer A". The buffers in the child process virtual address space 404 and/or the corresponding buffers within the parent process virtual address space 402 may be modified such that attempts to write to the buffers may trigger a page fault handler. In response to triggering the page fault handler, the page fault handler may copy data from the offset corresponding to a portion of the file data 124 corresponding to the buffer 1002 of the parent process, such as the buffer 1004 designated "Buffer A", to a corresponding portion of the file data 124 that corresponds to the buffer 1006 of the child process, such as a buffer 1008 designated "Buffer A (child)" in FIG. 10. Alternatively or in addition, the page fault handler may update the child process virtual address spaces 404 to point to the corresponding portion of the file data 124, such as the buffer 1008 designated "Buffer A (child)", corresponding to the buffer 1006 of the child process. Alternatively or in addition, one or more of the buffers 1002, 1006 in the child process virtual address space 404 and/or in the parent process virtual address space 402 may be modified such that subsequent attempts to write to the portions of the buffers corresponding to the copied portion, such as the buffer 1008 designated "Buffer A (child)", may not trigger the page fault handler.

As described elsewhere herein, pages of the file data 124 may be backed by the file 150.

FIG. 11 illustrates a flow diagram of an example of the client logic 120 for the page fault handler of the third embodiment, which is an example of a copy-on write embodiment. The process may start (1102) when a page fault occurs upon a faulted address. The client logic 120 may start by checking (1104) whether the page fault was for a write attempt or not.

If the page fault was not for a write attempt, the client logic 120 may check (1106) if the faulted address is for a virtual memory area of the child process which was forked from a corresponding parent virtual memory area. If so, the client logic 120 may look up (1108) the file offset in the kernel driver data structures. If the page fault was not for a virtual memory area of the child process which was forked, the client logic 120 may use (1110) the file offset corresponding to the virtual memory area of the currently executing process for the faulted address.

The client logic 120 may proceed by checking (1112) if there is a page in the file data 124 for the file offset. If there is a page in the file data 124 for the file offset, the client logic 120 may install the page of the file data 124 into the virtual memory area for the faulted address. The installed page may be installed as read-only (1114) if the page is shared with another file offset (1116) or installed as read-write (1118) if not shared with another file offset. If there is not a page in the file data 124 for the file offset, the client logic 120 may allocate a page in the file data 124, read (1120) data from the file 150 for the corresponding file offset into the page, optionally translate (1122) the data (as described elsewhere in this document), mark (1124) the page up-to-date, and install the page of the file data 124 into the virtual memory area for the faulted address. The installed page may be installed as read-only (1114) if the page is shared with another file offset (1116) or installed as read-write (1118) if not shared with another file offset. The client logic 120 may complete (1126) the page fault after the page is installed.

If the page fault was for a write attempt, the client logic 120 may check (1128) if the page is shared with another file offset. If the page is not shared with another file offset, the client logic 120 may mark (1130) the page table entry for the faulted address as writable and/or complete (1126) the page fault. If the page is shared with another file offset, the client logic 120 may allocate a page in the file data 124 for the offset corresponding to the virtual memory area of the child process for the faulted address, copy (1132) the file data 124 corresponding to the file offset into the allocated page, mark (1134) the page up-to-date, install the allocated page into the virtual memory area for the faulted address (with read-write (1118) access), and/or complete (1126) the page fault.

In a fourth embodiment, the intra-fork notification handler may defer selecting one or more portions of the file 150 to use as a backing store for the child process, and/or portions of the file 150 may be selected on demand. In lieu of selecting one or more portions of the file 150 to use as a backing store for the child process, the intra-fork notification handler may update metadata (such as a list of forked memory areas from the parent process) to enable this selection to be done later. For example, the page fault handler may select one or more portions of the file 150 to use as a backing store for the child process. Doing so may allow processes to fork that otherwise might not be able to do so, if there were insufficient unallocated space in the file 150 to use as a backing store for all memory areas of the child process. However, this might also result in the file 150 becoming overprovisioned, such that if the processes using memory mapped from the file 150 were to use too much of the memory represented in their virtual address spaces, then a subsequent page fault may be unable to identify any portion of the file 150 to use as a backing store for the faulted area of the virtual address space. In such a case, the page fault handler may indicate to the kernel and/or operating system that it is unable to satisfy the request, which may cause the kernel and/or operating system to kill one or more processes to free up memory. Alternatively, or in addition, the page fault handler may activate a mechanism within the kernel driver, which would kill one or more processes to free up space in the file 150.

Figure 12:
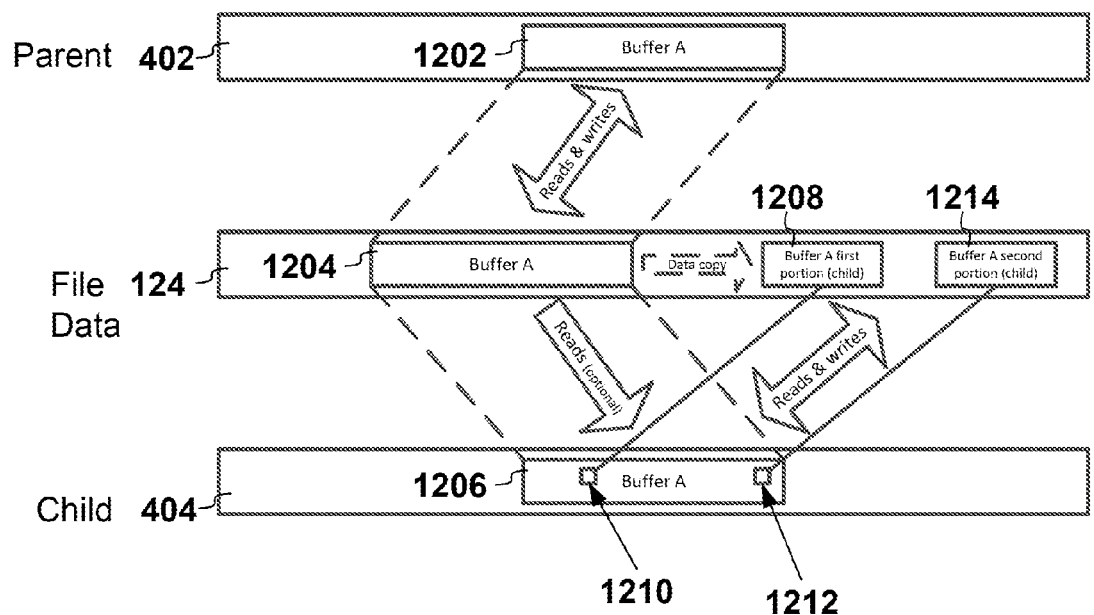
FIG. 12 illustrates a data flow diagram of a fourth embodiment.

FIG. 12 illustrates an example data flow diagram for the fourth embodiment that uses delayed allocation. The system 100 may include a parent process and a child process. The parent process and the child process may have the parent process virtual address space 402 and the child process virtual address space 404, respectively. The parent process virtual address space 402 may include a buffer 1202. The contents of the buffer 1202 may be stored in a portion of the file 150. Attempts to read at locations within the parent process virtual address space 402 that do not have a corresponding page in the file data 124 may trigger a page fault handler. In response, the page fault handler may allocate a page, read data from the file 150 at an offset corresponding to the virtual address, and/or may include the page in the file data 124 in the memory 108. Subsequent attempts to read at the same location may use the page in the file data 124 instead of triggering a page fault. For example, an attempt to read from the buffer 1202 in the parent process virtual address space 402 may trigger a page fault handler to allocate a buffer 1204 in the file data 124 (designated "Buffer A" in FIG. 12) and read the data from the file 150 at an offset corresponding to the virtual address of the buffer 1202 in the parent process virtual address space 402 into the buffer 1204 in the file data 124. A subsequent attempt to read from the buffer 1202 may read from the buffer 1204 in the file data 124 instead of triggering a page fault.

In response to the parent process forking, the child process may be created, the child process virtual address space 404 may be created, and/or one or more buffers may be created within the child process virtual address space 404 at the same location as corresponding buffers within the parent process virtual address space 402. For example, a buffer 1206 may be created within the child process virtual address space 404 at the same location (virtual address) as the corresponding buffer 1202 in the parent process virtual address space 402. The buffers in the child process virtual address space 404 may initially reference the same portions of the file 150 as the corresponding buffers within the parent process virtual address space 402. Attempts to read either of the buffers 1202 or 1206 in the parent process virtual address space 402 or child process virtual address space 404 may read from the location in the file data 124 corresponding to the parent process buffer, namely the buffer 1204 in the file data 124 designated "Buffer A". The buffers in the child process virtual address space 404 and/or the corresponding buffers within the parent process virtual address space 402 may be modified such that attempts to write to one or more of the buffers triggers a page fault handler. In response, the page fault handler may, for example, select a portion of the file 150 to use as a backing store for the buffer 1206 in the child process virtual memory area 404 at an offset 1210 within the buffer 1206 corresponding to the faulted address, copy data from the portion of the file data 124 corresponding to the faulted address to a portion 1208 of the file data 124 corresponding to selected portion of the file 150, update the child process virtual address spaces 404 to point to the portion 1208 of the file data 124 corresponding to the selected portion of the file 150, and/or modify one or both buffers 1202, 1206 in the child and parent process virtual address spaces 402, 404 such that subsequent attempts to write to the portion of the buffers 1202, 1206 corresponding to the copied portion do not trigger the page fault handler.

In response to writing to a second address in the buffer 1206 of the child process virtual address space 404, the page fault handler triggered by a resulting page fault may select a second portion of the file 150 to use as a backing store for the buffer 1206 in the child process virtual address space 404 at an offset 1212 within the buffer 1206 corresponding to the second faulted address, copy data from a portion of the buffer 1204 in the file data 124 designated "Buffer A" corresponding to the second faulted address to a second portion 1214 of the file data 124 corresponding to the second selected portion of the file 150, update the child process virtual address spaces 404 to point to the second portion 1214 of the file data 124 corresponding to the second selected portion of the file 150, and/or modify one or both buffers 1202, 1206 in the parent and child process virtual address spaces 402, 404 such that subsequent attempts to write to the second portion 1212 of the buffers 1202, 1206 corresponding to the copied portion do not trigger the page fault handler.

In a fifth embodiment, the parent process and the child process may each use a different file for its memory mappings. Alternatively, or in addition, the parent process and/or the child process may use multiple files.

Figure 13:
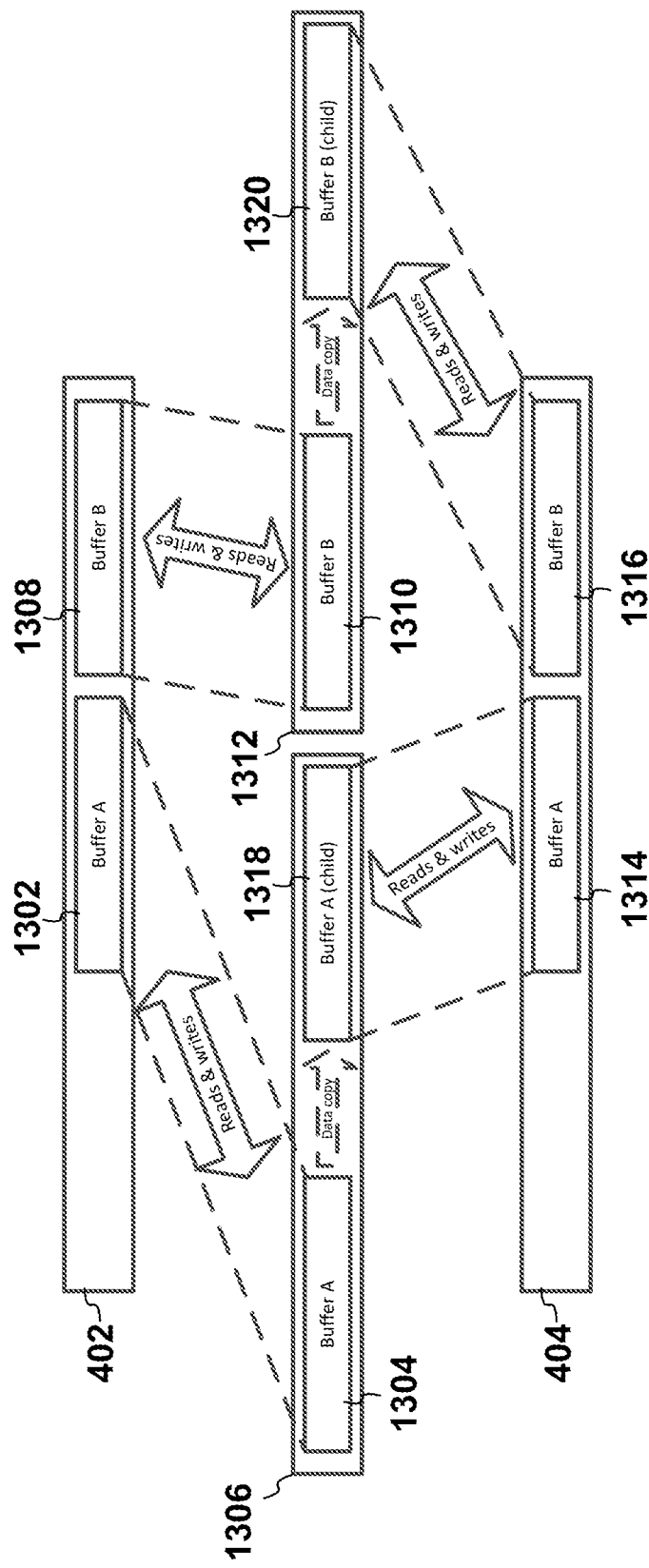
FIG. 13 illustrates a first example data flow diagram of a fifth embodiment.

FIG. 13 illustrates a first example data flow diagram of the fifth embodiment in which file-mapped memory for the parent process and the child process is mapped to multiple files. The system 100 may include a parent process and a child process. The parent process and the child process may have the parent process virtual address space 402 and the child process virtual address space 404, respectively. The parent process virtual address space 402 may include one or more buffers. The contents of a first buffer 1302 in the parent process virtual address space 402 may be stored in a portion 1304 of a first file 1306, such as the file 150 illustrated in FIG. 1. Alternatively or in addition, the contents of a second buffer 1308 may be stored in a portion 1310 of a second file 1312. Attempts to read or write at locations within the parent process virtual address space that do not have a corresponding page in the file data 124 may trigger a page fault handler. In response, the page fault handler may allocate a page, read data from the corresponding file at an offset corresponding to the virtual address, and/or may include the page in the file data 124 in the memory 108. Subsequent attempts to read or write at the same location may use the page in the file data 124 instead of triggering a page fault.

In response to the parent process forking, the child process may be created, the child process virtual address space 404 may be created, and/or one or more buffers 1314, 1316 may be created within the child process virtual address space 404 at the same location as corresponding buffers within the parent process virtual address space 402. The buffers 1314, 1316 in the child process virtual address space 404 may reference portions 1318, 1320 of the corresponding file 1306, 1320 that are different than the corresponding buffers 1302, 1308 within the parent process virtual address space 402. Data may be copied from the portions 1304, 1310 of the file(s) 1306, 1312 (and/or of the file data 124) corresponding to the buffers 1302, 1308 of the parent process virtual address space 402 to the portions 1318, 1320 of the file(s) 1306, 1312 (and/or of the file data 124) corresponding to the buffers 1314, 1316 of the child process virtual address space 404 as described elsewhere in this document.

Figure 14:
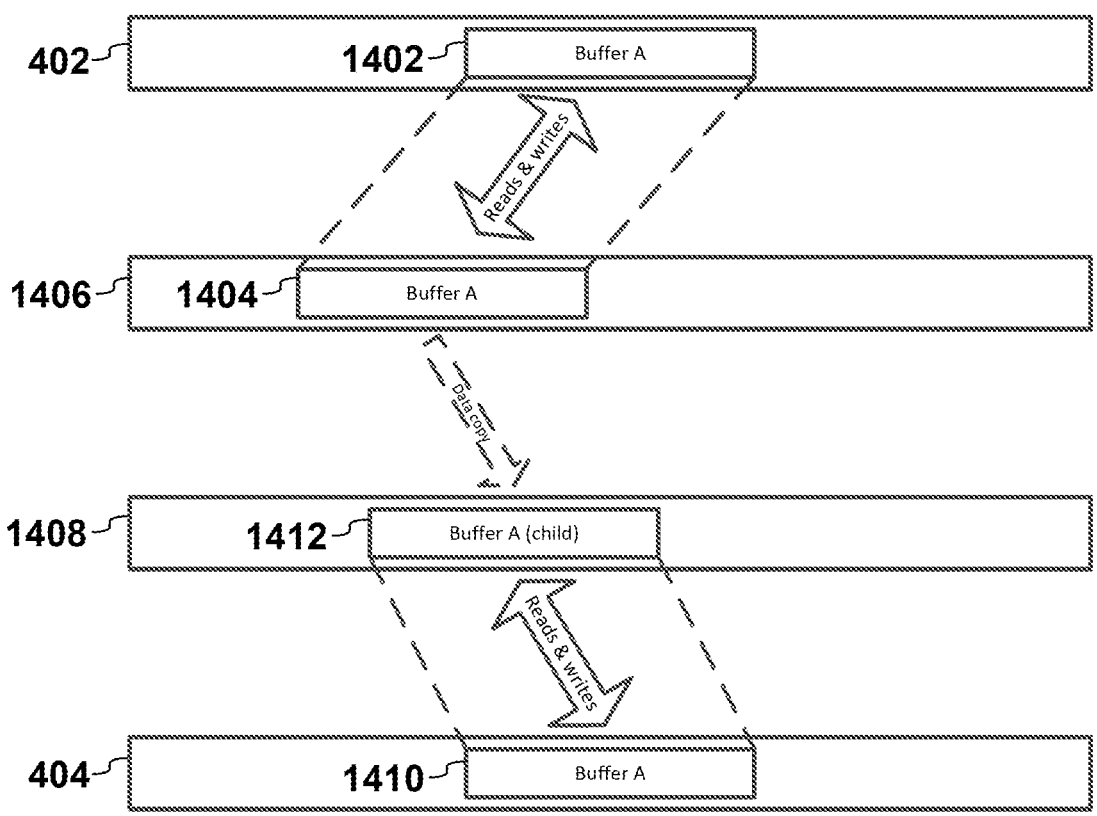
FIG. 14 illustrates a second example data flow diagram of a fifth embodiment.

FIG. 14 illustrates a second example data flow diagram of the fifth embodiment in which file mapped memory for the parent process and the child process is mapped to multiple files, a different file for each process. The system 100 may include a parent process and a child process. The parent process and the child process may have the parent process virtual address space 402 and the child process virtual address space 404, respectively. The parent process virtual address space 402 may include a buffer 1402. The contents of the buffer 1402 may be stored in a portion 1404 of a first file 1406, such as the file 150 illustrated in FIG. 1. Attempts to read or write at locations within the parent process virtual address space 402 that do not have a corresponding page in the file data 124 may trigger a page fault handler. In response, the page fault handler may allocate a page, read data from the portion 1404 of the corresponding file 1406 at an offset corresponding to the virtual address. Alternatively or in addition, the page fault handler may include the page in the file data 124 in the memory 108. Subsequent attempts to read or write at the same location may use the page in the file data 124 instead of triggering a page fault.

In response to the parent process forking, the child process may be created, the child process virtual address space 404 may be created, a second file 1408 may be created and/or opened, and/or one or more buffers may be created within the child process virtual address space 404 at the same location as corresponding buffers within the parent process virtual address space 402. For example, a buffer 1410 may be created in the child process virtual address space 404 at the same location as the corresponding buffer 1402 in the parent process virtual address space 402. The buffers in the child process virtual address space 404 may reference a different file (at the same or a different offset within the file) than the corresponding buffers within the parent process virtual address space. For example, the buffer 1410 in the child process virtual address space 404 may reference a portion 1412 of the second file 1408. Data may be copied from the portion 1404 of the first file 1406 (and/or of the file data 124) corresponding to the buffer 1402 of the parent process virtual address space 402 to the portion 1412 of the second file 1408 (and/or of the file data 124) corresponding to the buffer 1410 of the child process virtual address space 404 as described elsewhere in this document.

Figure 15:
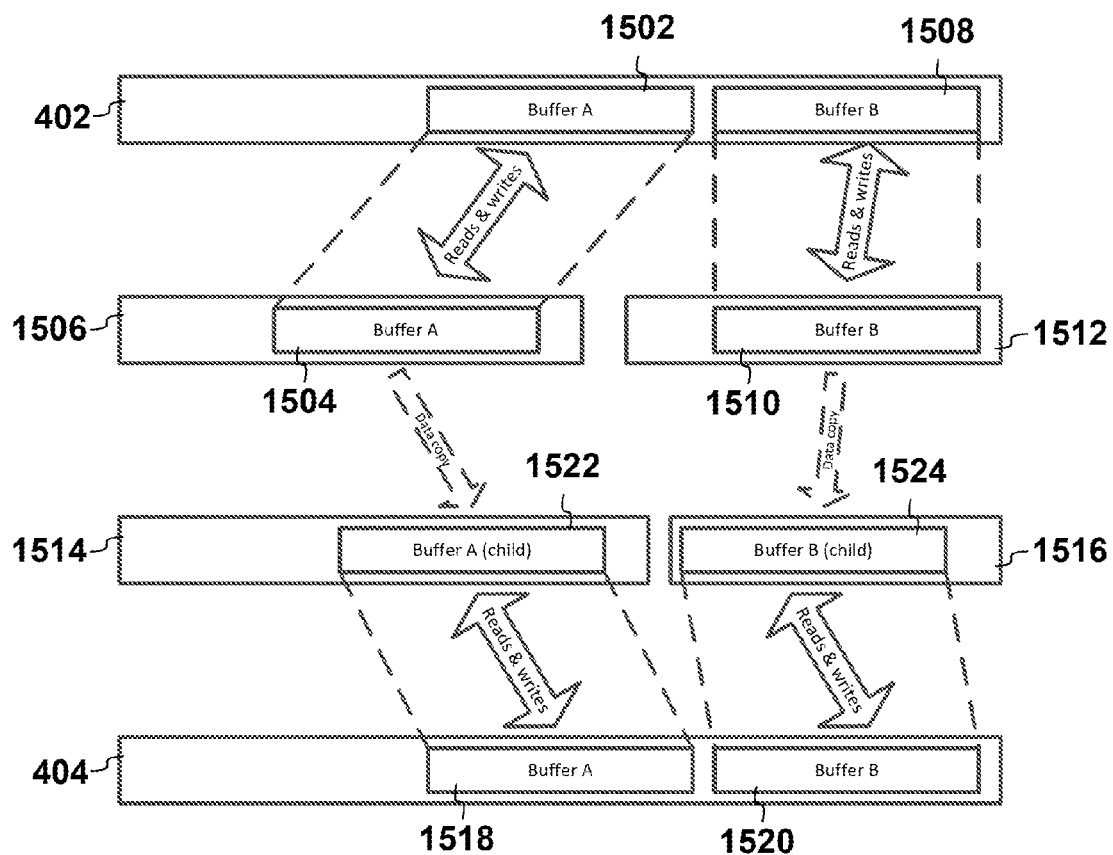
FIG. 15 illustrates a third example data flow diagram of a fifth embodiment.

FIG. 15 illustrates a third example data flow diagram of the fifth embodiment in which file mapped memory for the parent process and the child process is mapped to multiple files, a different set of files for each process. The system 100 may include a parent process and a child process. The parent process and the child process may have the parent process virtual address space 402 and the child process virtual address space 404, respectively. The parent process virtual address space 402 may include one or more buffers. The contents of a first buffer 1502 in the parent process virtual address space 402 may be stored in a portion 1504 of a first file 1506 and/or the contents of a second buffer 1508 in the parent process virtual address space 402 may be stored in a portion 1510 of a second file 1512. Attempts to read or write at locations within the parent process virtual address space 402 that do not have a corresponding page in the file data 124 may trigger a page fault handler. In response, the page fault handler may allocate a page, read data from the corresponding file 1506 or 1512 at an offset corresponding to the virtual address, and/or may include the page in the file data 124 in the memory 108. Subsequent attempts to read or write at the same location may use the page in the file data 124 instead of triggering a page fault.

In response to the parent process forking, the child process may be created, the child process virtual address space 404 may be created, one or more additional files (such as the third file 1514 and/or the fourth file 1516) may be created and/or opened, and/or one or more buffers 1518, 1520 may be created within the child process virtual address space 404 at the same location as corresponding buffers 1502, 1508 within the parent process virtual address space 402. The buffers 1518, 1520 in the child process virtual address space 404 may reference a different file (at the same or a different offset with the file) than the corresponding buffers 1502, 1508 within the parent process virtual address space 402. Data may be copied from the portions 1504, 1510 of the file(s) 1506, 1512 (and/or of the file data 124) corresponding to the buffers 1502, 1508 of the parent process virtual address space 402 to the portions 1522, 1524 of the file 1514, 1516 (and/or of the file data 124) corresponding to the buffers 1518, 1520 of the child process virtual address space 404 as described elsewhere in this document.

In a sixth embodiment, the user library and/or the kernel driver may include a memory-sharing interface. The user memory sharing interface may include an interface to retrieve the file offset of an allocated memory buffer. Alternatively, or in addition, the memory sharing interface may include an interface to cause any cached data for a specified allocated buffer and/or a specified file offset to be re-read from the file 150. Alternatively, or in addition, the memory sharing interface may include an interface to cause any cached data for a specified allocated buffer and/or a specified file offset to be written back to the file 150. Alternatively, or in addition, the memory sharing interface may include an interface to map a specified offset of the file 150 into the virtual address space of the user process. The user process may use the memory-sharing interface to facilitate sharing memory between multiple user processes executing on the same client and/or between multiple user processes executing on the different clients. For example, if the file 150 includes an interface that provides access to a corresponding area of memory in the memory appliance 104, the data for a specified allocated buffer may be written to from one user process on a first client and may be read and/or processed from one or more other user processes on one or more other clients. The interface to retrieve the file offset of an allocated memory buffer may be included in the allocation interface, and/or in any other interface including any interface independent of the allocation interface. In one example, the file offset may be returned by the allocation interface as additional metadata when allocating memory. In another example, the user process and/or user library may issue a request to the kernel driver to retrieve the file offset for a specified allocated memory buffer.

Figure 16:
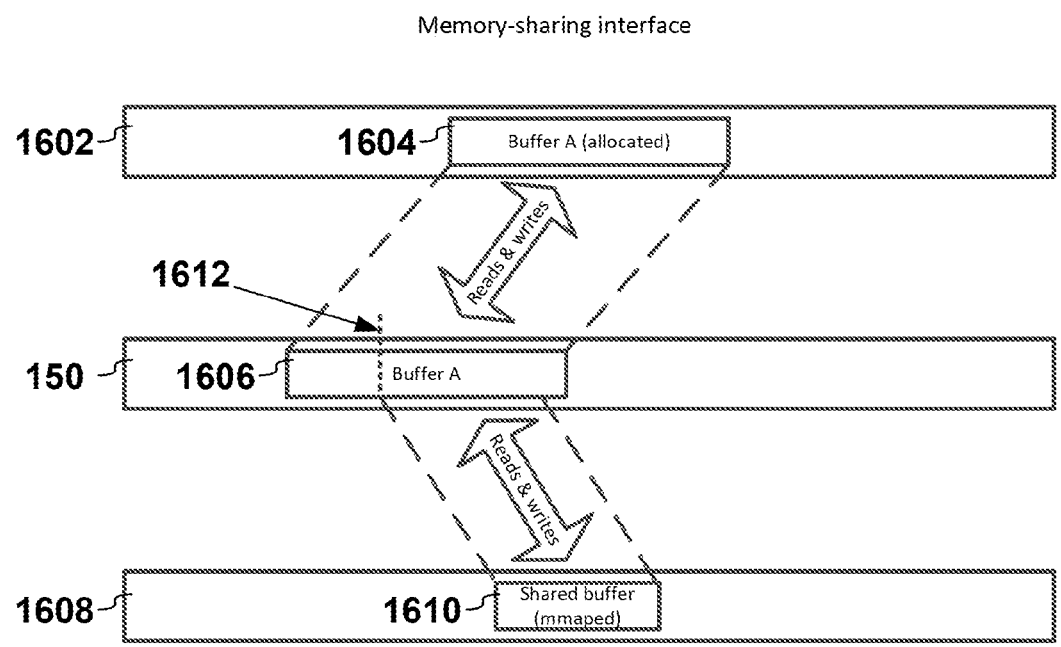
FIG. 16 illustrates a data flow diagram of a sixth embodiment.

FIG. 16 illustrates an example data flow diagram of the sixth embodiment in which the memory-sharing interface is used in the file mapping of memory. The system 100 may include a first process and a second process. The first process and the second process may each have a corresponding virtual address space 1602, 1608. The first process virtual address space 1602 may include a buffer 1604. The buffer 1604 may have been allocated via the allocation interface and/or may have been forked from a parent process. The contents of the buffer 1604 in the first process virtual address space 1602 may be stored in a portion 1606 of the file 150. Attempts to read or write at locations within the first virtual address space 1602 that do not have a corresponding page in the file data 124 may trigger a page fault handler. In response, the page fault handler may allocate a page, read data from the file 150 at an offset corresponding to the virtual address, and/or may include the page in the file data 124 in the memory 108. Subsequent attempts to read or write at the same location may use the page in the file data 124 instead of triggering a page fault.

The second process may obtain a shared buffer offset 1612 corresponding to all of or a portion of the buffer 1604 in the first process virtual address space 1602 (for example, by receiving the shared buffer offset 1612 from the first process). The second process may memory map a portion 1606 of the file 150 at the shared buffer offset 1612 into a memory-mapped buffer 1610 in the second process virtual address space 1608. The memory-mapped buffer 1610 in the second process virtual memory address space 1608 may refer to an overlapping portion of the file 150 as the buffer 1604 in the first process virtual memory address space 1602. Attempts to write to the data included in either virtual memory address space 1602, 1608 may cause the contents of the portion 1606 of the file 150 to be changed. Reading the corresponding location in the other virtual memory address space 1602, 1608 may return the changed contents.

In a seventh embodiment, the kernel driver and/or the user library may perform one or more types of data translation on the data backed by the file 150. For example, the kernel driver and/or the user library may perform data translation upon the data when writing from local memory to the file 150 and/or when reading from the file 150 to local memory. For example, the kernel driver and/or the user library may perform data translation upon the data when writing from the file data 124 to the file 150 and/or when reading the data from the file 150 into the file data 124. Data translation may include manipulating the data being read and/or written.

In a first example, the kernel driver and/or the user library may compress the data being written to the file 150 and/or decompress the data being read from the file 150. Compression and/or decompression may be performed using any one or more compression schemes, such as Lempel-Ziv (LZ), DEFLATE, Lempel-Ziv-Welch (LZW), Lempel-Ziv-Renau (LZR), Lempel-Ziv-Oberhumer (LZO), Huffman encoding, LZX, LZ77, Prediction by Partial Matching (PPM), Burrows-Wheeler transform (BWT), Sequitur, Re-Pair, arithmetic code, and/or any other scheme which may be used to recoverably reduce the size of data.

In a second example, the kernel driver and/or the user library may encrypt the data being written to the file 150 and/or decrypt the data being read from the file 150. Encryption and/or decryption may be performed using any one or more encryption schemes and/or ciphers, such as symmetric encryption, public-key encryption, block ciphers, stream ciphers, substitution ciphers, transposition ciphers, and/or any other scheme which may be used to encode information such that only authorized parties may decode it.

In a third example, the kernel driver and/or the user library may perform error detection and/or error correction upon the data being written to the file 150 and/or the data being read from the file 150. Error detection and/or error correction may be performed using any one or more error detection and/or error correction schemes, such as repetition codes, parity bits, checksums, cyclic redundancy checks, cryptographic hash functions, error correcting codes, forward error correction, convolutional codes, block codes, Hamming codes, Reed-Solomon codes, Turbo codes, low-density parity-check codes (LDPC), and/or any other scheme which may be used to detect and/or correct data errors.

Figure 17:
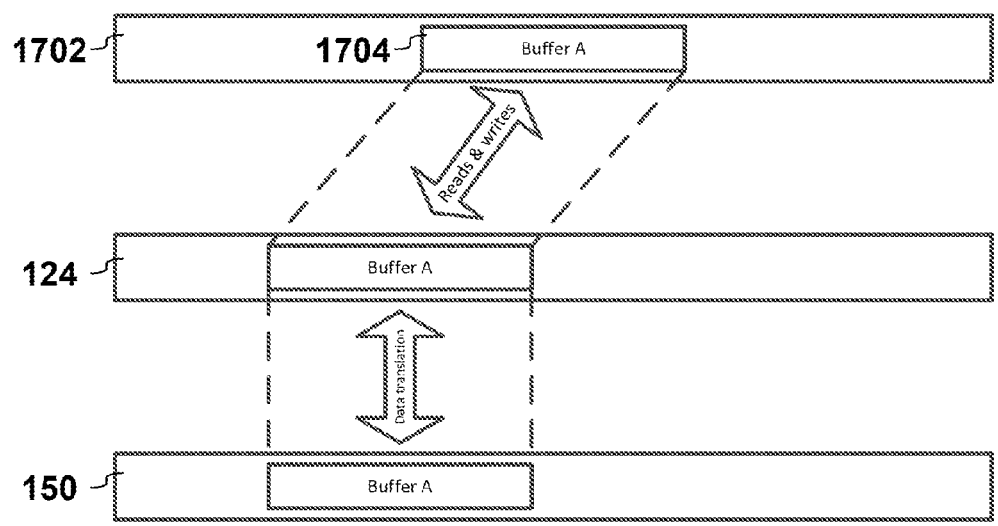
FIG. 17 illustrates a data flow diagram of a seventh embodiment.

FIG. 17 illustrates an example data flow diagram of the seventh embodiment in which data translation is performed on the data backed by the file 150. The system 100 may include a process. The process may have a virtual address space 1702. The virtual address space 1702 may include a buffer 1704. The buffer may have been memory-mapped, may have been allocated via the allocation interface, and/or may have been forked from a parent process. All of or a portion of the contents of the buffer 1704 may be stored in the file data 124. Attempts to read or write at locations within the virtual address space 1702 that do not have a corresponding page in the file data 124 may trigger a page fault handler. In response, the page fault handler may allocate a page, read data from the file 150 at an offset corresponding to the virtual address, translate the data read from the file 150, and/or may include the page with the translated data in the file data 124 in the memory 108. Subsequent attempts to read or write at the same location may use the page in the file data 124 instead of triggering a page fault. Attempts to write-back data from the file data 124 to the file 150 may cause the data to be translated when writing back to the file 150.

In an eighth embodiment, the kernel and/or operating system may be modified to perform all of or a portion of the functionality of the kernel driver and/or the user library, and/or to make all of or a portion of the functionality of the kernel driver and or the user library not necessary.

In a first example, the kernel and/or operating system may be modified to provide an interface to execute a second post-fork notification interface. The second post-fork notification interface may be executed immediately after forking in the child process and/or before the kernel and/or operating system allows the child process to start executing. The second post-fork notification interface may perform all of or a portion of the functionality of the post-fork notification interface for the child process. With the second post-fork notification interface in use, the user library may not need to include a segmentation fault notification handler, the user library may not need to include a child-post-fork notification handler, the kernel driver may not need to provide a segmentation fault notification interface, and/or the kernel driver may not need to provide a post-fork notification interface for the child process.

Figure 18:
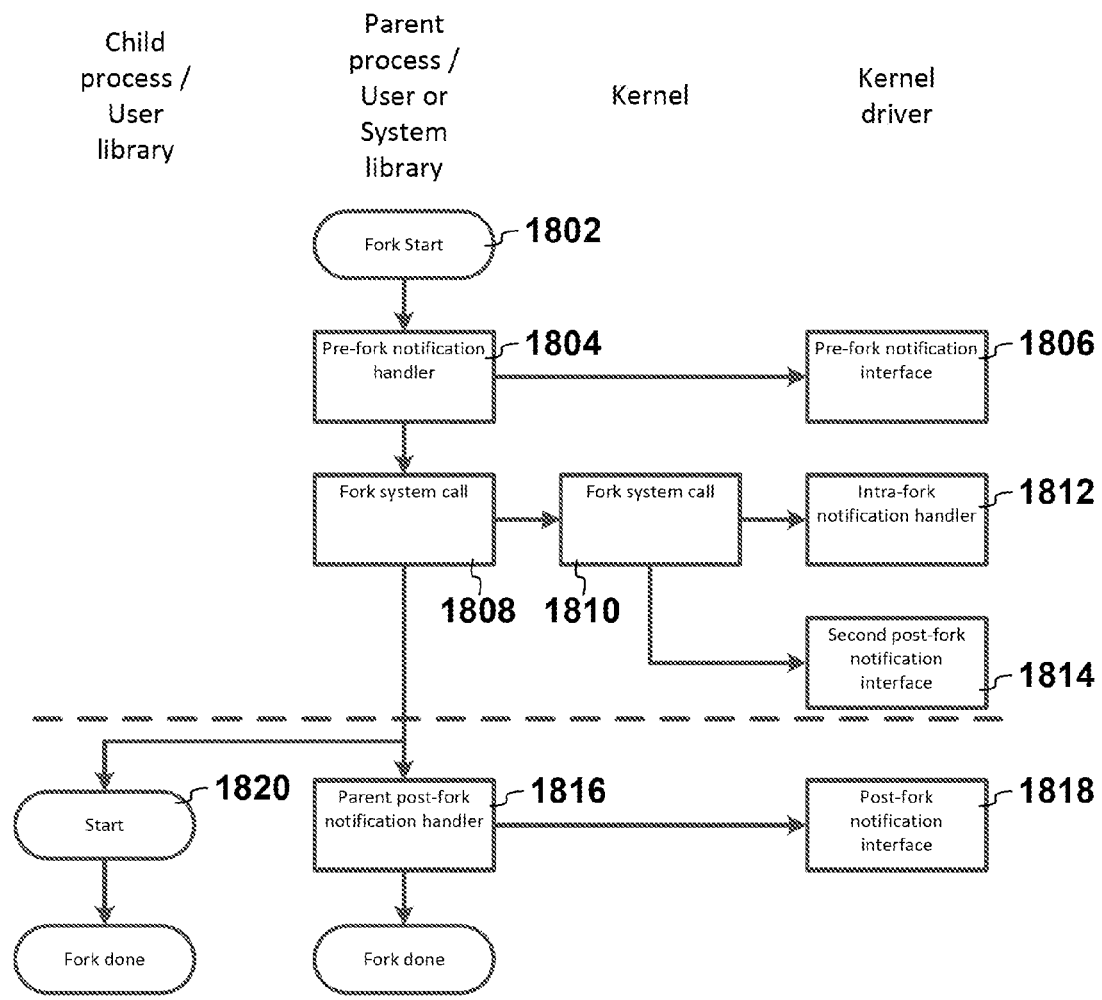
FIG. 18 illustrates a flow diagram of logic for a first example of an eighth embodiment.

FIG. 18 illustrates a flow diagram of an example of the logic for the first example of the eighth embodiment in which the kernel and/or the operating system is modified to provide an interface to execute a second post-fork notification interface. In the example illustrated in FIG. 18, operations may start (1802) when the application logic 122 requests a fork operation with the system library. The system library may begin by executing (1804) the pre-fork notification handler of the user library. The pre-fork notification handler may perform the actions described elsewhere in this document and/or may trigger (1806) the pre-fork notification interface of the kernel driver.

Upon completion of the pre-fork notification handler, the system library may execute (1808) the fork system call (1810) (or an equivalent system call) with the kernel. In response, the kernel may execute (1812) the intra-fork notification handler via the mechanisms described elsewhere in this document. Additionally, the kernel may execute (1814) the second post-fork notification interface. The kernel may ensure that the second post-fork notification interface executes prior to allowing the child process to start executing.

Upon completion of the fork system call, the system library may execute (1816) the parent post-fork notification handler. The parent post-fork notification handler may perform the actions described elsewhere in this document and/or may trigger (1818) the post-fork notification interface of the kernel driver. Upon completion of the parent post-fork notification handler, the parent process may proceed as if the fork operation were complete.

Also upon completion of the fork system call, the child process may be started (1820) by the kernel and the child process may proceed as if the fork operation were complete.

In a second example, the kernel and/or operating system may be modified to allow the intra-fork notification handler to modify the virtual memory mappings of the child process, and/or to install new mappings for the child process. For example, the kernel and/or operating system may be modified to tolerate the intra-fork notification handler changing the file offset for a virtual memory mapping, such as by re-scanning the virtual memory areas of the child process to correct any out-of-order mappings in the kernel's and/or operating system's data structures. Alternatively, or in addition, the kernel and/or operating system may be modified to provide an interface for installing new mappings for a process that is not the currently executing process. Using one or more of these interfaces, the intra-fork notification handler may perform all of or a portion of the functionality of the post-fork notification interface for the child process. As a result, the user library may not need to include a segmentation fault notification handler, the user library may not need to include a child-post-fork notification handler, the kernel driver may not need to provide a segmentation fault notification interface, and/or the kernel driver may not need to provide a post-fork notification interface for the child process.

Figure 19:
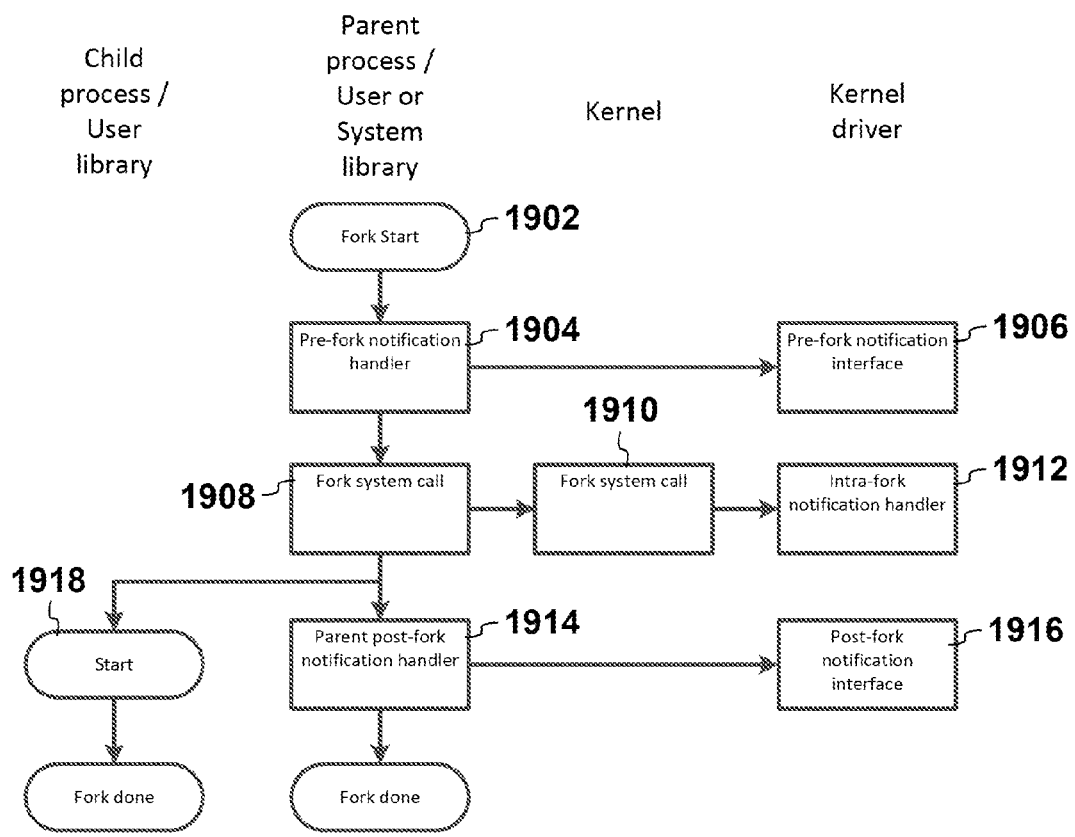
FIG. 19 illustrates a flow diagram of logic for a second example of an eighth embodiment.

FIG. 19 illustrates a flow diagram of an example of the logic for the second example of the eighth embodiment in which the kernel and/or operating system is modified to allow the intra-fork notification interface to modify the virtual memory mappings of the child process, and/or to install new mappings for the child process. In the example illustrated in FIG. 19, the application logic 122 requests a fork operation with the system library, starting the process. The system library may begin (1902) by executing (1904) the pre-fork notification handler of the user library. The pre-fork notification handler may perform the actions described elsewhere in this document and/or may trigger (1906) the pre-fork notification interface of the kernel driver.

Upon completion of the pre-fork notification handler, the system library may execute (1908) the fork system call (1910) (or an equivalent system call) with the kernel. In response, the kernel may execute (1912) the intra-fork notification handler via the mechanisms described elsewhere in this document.

Upon completion of the fork system call, the system library may execute (1914) the parent post-fork notification handler. The parent post-fork notification handler may perform the actions described elsewhere in this document and/or may trigger (1916) the post-fork notification interface of the kernel driver. Upon completion of the parent post-fork notification handler, the parent process may proceed as if the fork operation were complete.

Also upon completion of the fork system call, the child process may be started (1918) by the kernel and the child process may proceed as if the fork operation were complete.

In a third example, the kernel and/or operating system may be modified to execute an intra-fork notification handler other than the virtual-memory-area "open" interface. For example, the kernel and/or operating system may be modified to provide an at-fork interface, which may execute a registered interface during a fork operation. The registered interface may perform all of or a portion of the functionality of the intra-fork notification handler. Alternatively, or in addition, the kernel driver may install the registered interface as a debugging hook, a tracing hook, and/or a kernel patch, such that it may be executed during a fork operation. Alternatively, or in addition, the debugging hook, the tracing hook, and/or the kernel patch may be installed without modifying the kernel and/or operating system. Using one or more of these interfaces, the kernel driver may not need to create the one or more memory mappings in such a way to indicate to the operating system that the mapping is to be copied to the child process during a fork operation, and/or the kernel driver may not need to provide a virtual-memory-area "open" interface.

In a fourth example, the kernel and/or operating system may be modified to provide an interface for the first file descriptor to be duplicated during the fork operation. For example, the first file descriptor may be configured to be duplicated during fork operations and/or the fork operation may have a parameter instructing it to duplicate file descriptors during the fork operation. Duplicating the first file descriptor during a fork operation may include creating the second file descriptor for the child process, executing a registered interface in the kernel driver, and/or installing the second file descriptor in place of the first file descriptor for the child process. The registered interface may be the intra-fork notification handler and/or may perform all of or a portion of the functionality of the intra-fork notification handler. Using these interfaces, the kernel driver may not need to create the one or more memory mappings in such a way to indicate to the operating system that the mapping is to be copied to the child process during a fork operation, and/or the kernel driver may not need to provide a virtual-memory-area "open" interface.

Further examples may include combinations of the modifications described in previous examples and/or may include alternate modifications that serve the same or a similar purpose. For example, the kernel and/or operating system may be modified to provide an interface for the first file descriptor to be duplicated during the fork operation; and to provide the ability for the registered interface to modify the virtual memory mappings of the child process, and/or to install new mappings for the child process. In another example, the kernel and/or operating system may be modified to provide an interface for the first file descriptor to be duplicated during the fork operation and/or to provide an interface to execute a second post-fork notification interface immediately after forking in the child process and/or before the kernel and/or operating system allows the child process to start executing.

In a ninth embodiment, all of or a portion of the functionality of the kernel driver may be provided by the user library. As such, in at least one example implementation, there may be no kernel driver.

In one example, the functionality of the memory allocation interface of the kernel driver may be provided by a memory allocation handler of the user library. For example, the memory allocation handler may select a portion of the file 150 to use as a backing store for the allocation request. The memory allocation handler may map the selected portion of the file 150 into the virtual address space of the user process accessing the memory allocation interface. The selected portion may be mapped in such a way to indicate to the operating system that the mapping is not to be copied to a child process during a fork operation. The memory allocation handler may block or return a busy status if the user library data structures indicate that a fork is in progress. All of or a portion of the user library data structures may be included in an area of shared memory accessible to both the parent process and the child process.

In another example, the functionality of the memory freeing interface of the kernel driver may be provided by a memory freeing handler of the user library. For example, the memory freeing handler may unmap an identified portion of the virtual address space and/or may update internal state and/or user library data structures to indicate that the portion of the file 150, corresponding to the identified portion of the virtual address space, is available for future allocation. The memory freeing handler may block or return a busy status if the user library data structures indicate that a fork is in progress.

In another example, the functionality of the pre-fork notification interface of the kernel driver may be provided by the pre-fork notification handler of the user library. For example, the pre-fork notification handler may set a state and/or one or more indicators of the user library data structures indicating the progress of activities related to the forking operation.

In another example, the functionality of the intra-fork notification handler of the kernel driver may be provided by the pre-fork notification handler of the user library, by the segmentation fault handler of the user library, and/or by the child post-fork notification handler of the user library. For example, the pre-fork notification handler may select one or more portions of the file 150 to use as a backing store for the child process corresponding to one or more of the memory areas that had been allocated to the parent process previously. The user library data structures may include one or more linked lists or trees to associate parent process memory areas with one or more child process areas.

In another example, the functionality of the post-fork notification interface of the kernel driver may be provided by the child and/or parent post-fork notification handler of the user library. For example, the parent post-fork notification handler may update the state and/or indicators to indicate that a fork is no longer in progress. Alternatively, or in addition, the child post-fork notification handler may create one or more memory mappings associated with the one or more portions of the file 150 that were selected by the user library to use as a backing store for the child process. If the state and/or the one or more indicators indicate that any of these steps have already been performed, then the post-fork notification interface may skip these steps. If the post-fork notification interface determines that an error has occurred that would prevent the child process from having the desired virtual memory mappings, it may cause the child process to exit, such as by sending a signal to the child process.

In another example, the functionality of the segmentation fault signal notification interface of the kernel driver may be provided by the segmentation fault handler of the user library. For example, the segmentation fault handler may, if executed by the child process, create one or more memory mappings associated with the one or more portions of the file 150 that were selected by the user library to use as a backing store for the child process. If the state and/or the one or more indicators indicate that any of these steps have already been performed, then the segmentation fault handler may skip these steps.

In another example, the functionality of the page fault handler of the kernel driver may be provided by the segmentation fault handler of the user library. For example, segmentation fault handler may unmap, remap, and/or modify virtual memory mappings in order to provide copy-on-write sharing of data from parent memory areas with the child process.

In another example, the functionality of the file descriptor close interface may be provided by a destructor handler in the user library. The destructor handler may be any interface that is executed when the process exits and/or when the file descriptor is closed. For example, the destructor handler may for each previously allocated portion of the file 150 that was allocated by the allocation interface using the file descriptor but that hasn't been freed by the freeing interface, update internal state and/or user library data structures to indicate that the portion of the file 150 is available for future allocation.

Figure 20:
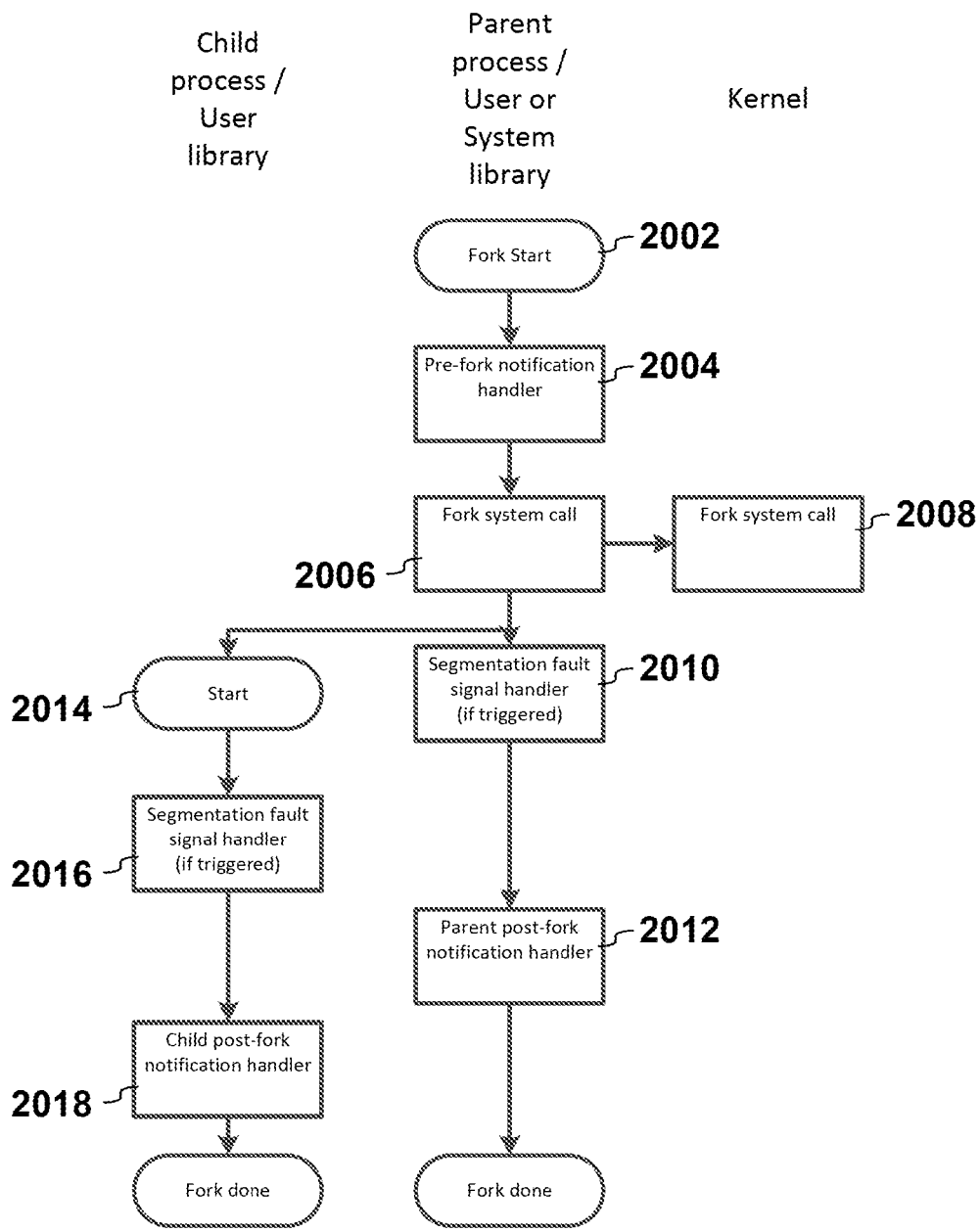
FIG. 20 illustrates a flow diagram of an example of logic of a ninth embodiment.

FIG. 20 illustrates a flow diagram of an example of the logic of the ninth embodiment in which all of or a portion of the functionality of the kernel driver may be provided by the user library. In the example illustrated in FIG. 20, the application logic 122 requests a fork operation with the system library, starting the process. The system library may begin (2002) by executing (2004) the pre-fork notification handler of the user library. The pre-fork notification handler may perform the actions described elsewhere in this document.

Upon completion of the pre-fork notification handler, the system library may execute (2006) the fork system call (2008) (or an equivalent system call) with the kernel.

Upon completion of the fork system call, the system library may perform some activities related to the fork operation in the parent process. If any of these activities (or any activities in other threads of the parent process) trigger a segmentation fault, the segmentation fault signal handler may be executed (2010) with the user library. The segmentation fault signal handler may perform the actions described elsewhere in this document.

Upon completion of activities related to the fork operation in the parent process, the system library may execute (2012) the parent post-fork notification handler. The parent post-fork notification handler may perform the actions described elsewhere in this document. Upon completion of the parent post-fork notification handler, the parent process may proceed as if the fork operation were complete.

Also upon completion of the fork system call, the child process may be started (2014) by the kernel. Upon starting of the child process, the system library may perform some activities related to the fork operation in the child process. If any of these activities trigger a segmentation fault, the segmentation fault signal handler may be executed (2016) with the user library. The segmentation fault signal handler may perform the actions described elsewhere in this document.

Upon completion of activities related to the fork operation in the child process, the system library may execute (2018) the child post-fork notification handler. The child post-fork notification handler may perform the actions described elsewhere in this document. Upon completion of the child post-fork notification handler, the child process may proceed as if the fork operation were complete.

It should be clear to one skilled in the art that there are alternate embodiments to those explicitly described above. Further alternate embodiments may include a combination of some or all of the features of the explicitly described embodiments and/or alternate embodiments. As such, the explicitly described embodiments should be seen as exemplary, and not an exhaustive list. For example, another embodiment may include using copy-on-write mappings and portions of the file 150 may be selected on demand for the child process. In another example, the kernel and/or operating system may be modified to perform all of or a portion of the functionality of the kernel driver and/or the user library, and the kernel, operating system, and/or kernel driver may use copy-on-write mappings. In yet another example, the kernel, operating system, and/or other code may dynamically select one of the embodiments from among a set of the embodiments based on a determination of that the selected embodiment is suitable for the forked child process. Alternatively or in addition, the parent process may indicate which of the embodiments is selected.

A memory allocation module may include one or more modules. For example, the memory allocation module may include the memory allocation wrapper. Alternatively or in addition, the memory allocation module may include, for example, the memory allocation interface, the memory freeing interface, the pre-fork notification interface, the intra-fork notification handler, the segmentation fault signal notification interface, the post-fork notification interface, the file descriptor close interface, the page fault handler, the page fault handler, the segmentation fault signal handler, the pre-fork notification handler, the pre-fork handler, the intra-fork notification handler, the post-fork notification handler, the at-fork interface, the component executed in a background process, the system library, the user library, the malloc handler, the free handler, the mmap handler, the munmap handler, the brk handler, the sbrk handler, and/or the memory allocation handler. Alternatively, the memory allocation module may include entirely different components. The term "method" used in conjunction with a name refers to a programmatic procedure comprising executable instructions as opposed to a series of operations. The term "interface" or "handler" may refer to a definition of a programmatic procedure that includes, for example, a procedure name, procedure arguments, and procedure argument types. Alternatively or in addition, the term "interface" or "handler" may refer to one or more programmatic procedures that include a definition and an implementation.

The memory allocation module may be included in the client logic 120 in some examples. Alternatively, the memory allocation module may be separate from the client logic 120.

In one example, a system comprising a mapping and a memory allocation module is provided. The mapping may be of a first portion of a memory-mapped file to a virtual address for a first process. The memory allocation module may be configured to map a second portion of the memory-mapped file to the virtual address for a second process based on the second process forked from the first process.

The memory allocation module may be configured to create a copy of data associated with the first portion of the memory-mapped file in response to a write to the virtual address by the second process. The memory allocation module may be configured to create a copy of data associated with the first portion of the memory-mapped file when the second process is forked from the first process.

The memory-mapped file may be mapped to a pseudo file. In an alternative example, the memory-mapped file may be mapped to a traditional file.

A method for providing fork-safe memory allocation from memory-mapped files may be provided. A first portion of a memory-mapped file may be allocated to a virtual address for a first process. A second portion of the memory-mapped file may be allocated to the virtual address for a second process based on a forking of the second process from the first process.

The system 100 may be implemented with additional, different, or fewer components. Each component may include additional, different, or fewer components.

The processor 112 may be in communication with the memory 108 and the network interface. In one example, the processor 112 may also be in communication with additional elements, such as a display. Examples of the processor 112 may include a general processor, a central processing unit, a microcontroller, a server, an application specific integrated circuit (ASIC), a digital signal processor, a field programmable gate array (FPGA), a digital circuit, and/or analog circuit.

The processor 112 may be one or more devices operable to execute logic. The logic may include computer executable instructions or computer code embodied in the memory 108 that when executed by the processor 112, cause the processor 112 to perform the features implemented by the logic. The computer code may include instructions executable with the processor 112.

The system 100 may be implemented in many different ways. Each module, such as the memory allocation wrapper, may be hardware or a combination of hardware and software. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include memory hardware, such as a portion of the memory 108 in the client 102, for example, that comprises instructions executable with the processor 112 to implement one or more of the features of the module. When any one of the modules includes the portion of the memory 108 that comprises instructions executable with the processor 112, the module may or may not include the processor 112. In some examples, each module may just be the portion of the memory 108 in the client 102 or other physical memory that comprises instructions executable with the processor 112 to implement the features of the corresponding module without the module including any other hardware. Because each module includes at least some hardware even when the included hardware comprises software, each module may be interchangeably referred to as a hardware module, such as the memory allocation hardware module.

Some features are shown stored in a computer readable storage medium (for example, as logic implemented as computer executable instructions or as data structures in memory). All or part of the system 100 and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the system 100 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL)).

All of the discussion, regardless of the particular implementation described, is exemplary in nature, rather than limiting. For example, although selected aspects, features, or components of the implementations are depicted as being stored in memories, all or part of the system 100 or systems may be stored on, distributed across, or read from other computer readable storage media, for example, secondary storage devices such as hard disks, flash memory drives, floppy disks, and CD-ROMs. Moreover, the various modules and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system.

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same program or apparatus. The components may be resident on separate hardware, such as separate removable circuit boards, or share common hardware, such as a same memory and processor for implementing instructions from the memory. Programs may be parts of a single program, separate programs, or distributed across several memories and processors.

Although specific steps of methods are illustrated in flow diagrams, additional, fewer, or different steps may be included in the illustrated methods. In addition, the steps may be performed in an order different than illustrated.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

What is claimed is:

1. A system comprising:
    a memory comprising a mapping of a first portion of a memory-mapped file to a virtual address for a first process, wherein the memory-mapped file comprises virtual memory backed by a file; and
    a processor configured to:
    map a second portion of the memory-mapped file to the virtual address for a second process in response to a forking of the second process from the first process, wherein the first and second portions of the memory-mapped file are backed by the file; and
    write data from the first and second portions of the memory-mapped file to corresponding first and second portions of the file that backs the memory-mapped file.

2. The system of claim 1, wherein the processor is configured to create a copy of data associated with the first portion of the memory-mapped file in response to a write to the virtual address by the first process or the second process.

3. The system of claim 1, wherein the processor is configured to create a copy of data associated with the first portion of the memory-mapped file when the second process is forked from the first process.

4. The system of claim 1, wherein the processor is configured to create a copy of data associated with the first portion of the memory-mapped file in response to a memory access operation on the virtual address by the first process or the second process.

5. The system of claim 1, wherein the file is a pseudo file.

6. A method for providing fork-safe memory allocation from memory-mapped files, the method comprising:
    allocating a first portion of a memory-mapped file to a virtual address for a first process;
    allocating a second portion of the memory-mapped file to the virtual address for a second process in response to forking the second process from the first process, wherein the first portion of the memory-mapped file and the second portion of the memory-mapped file are mapped to a first offset and a second offset, respectively, of a file that backs the memory-mapped file; and
    writing contents of the first and second portions of the memory-mapped file to corresponding first and second portions of the file that backs the memory-mapped file.

7. The method of claim 6, further comprising selecting the second offset of the file for the second portion of the memory-mapped file when the virtual address is accessed and/or written by the second process forked from the first process.

8. The method of claim 6, wherein the file includes a first file and a second file, and wherein the first portion of the memory-mapped file is mapped to the first offset of the first file and the second portion is mapped to the second offset of the second file.

9. The method of claim 6, wherein allocating the first portion of a memory-mapped file comprises allocating the first portion in response to an invocation of an mmap( ) programmatic procedure configured to allocate anonymous memory.

10. The method of claim 6, wherein allocating the first portion of a memory-mapped file comprises allocating the first portion in response to an invocation of a malloc( ) programmatic procedure configured to allocate anonymous memory.

11. The method of claim 6, wherein allocating the first portion of a memory-mapped file comprises allocating the first portion in response to an invocation of a brk( ) programmatic procedure configured to allocate anonymous memory.

12. The method of claim 6, wherein allocating the first portion of a memory-mapped file comprises allocating the first portion in response to an invocation of a sbrk( ) programmatic procedure configured to allocate anonymous memory.

13. An apparatus comprising:
    a processor; and
    a memory, the memory comprising:
    a first virtual address space for a first process executed by the processor;
    a second virtual address space for a second process executed by the processor, wherein a virtual address is in both the first virtual address space and the second virtual address space;
    at least a subset of a memory-mapped file, the memory-mapped file comprising a first portion and a second portion that include virtual memory backed by a file; and
    a memory allocation module configured to map the virtual address in the first virtual address space for the first process to the first portion of the memory-mapped file and to map the virtual address in the second virtual address space for the second process to the second portion of the memory-mapped file in response to a forking of the second process from the first process, wherein the memory allocation module is further configured to write contents of the first and second portions of the memory-mapped file to corresponding first and second portions of the file that backs the memory-mapped file.

14. The apparatus of claim 13, wherein the memory allocation module is further configured to encrypt data associated with the first portion or the second portion of the memory-mapped file before or as the data is written to the memory-mapped file, wherein the memory-mapped file includes virtual memory assigned to a pseudo file.

15. The apparatus of claim 14 wherein the memory allocation module is further configured to read the encrypted data from the memory-mapped file and decrypt the encrypted data after or as the encrypted data is read from the memory-mapped file.

16. The apparatus of claim 13, wherein the memory allocation module comprises executable instructions included in an operating system.

17. The apparatus of claim 13, wherein the memory allocation module comprises executable instructions included in a kernel or kernel module.

18. The apparatus of claim 13, wherein the memory-mapped file is mapped to an interface configured to provide access over a network to a corresponding area of primary memory of a memory appliance.

19. The apparatus of claim 18, wherein access over the network to the corresponding area of primary memory of the memory appliance is via client-side memory access in which a communication interface of the memory appliance is configured to access the corresponding area of primary memory of the memory appliance.

20. The apparatus of claim 13, wherein the first process and/or the second process are included in a container, a jail, and/or a zone.

* * * * *